US008626446B2

(12) United States Patent
Dong et al.

(10) Patent No.: US 8,626,446 B2
(45) Date of Patent: Jan. 7, 2014

(54) METHOD OF DIRECTIONAL RESISTIVITY LOGGING

(75) Inventors: Qiuzhao Dong, Katy, TX (US); Tsili Wang, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 299 days.

(21) Appl. No.: 13/078,602

(22) Filed: Apr. 1, 2011

(65) Prior Publication Data

US 2012/0253676 A1 Oct. 4, 2012

(51) Int. Cl.
*G01V 1/40* (2006.01)

(52) U.S. Cl.
USPC .......................................................... 702/7

(58) Field of Classification Search
USPC .......................................................... 702/7
See application file for complete search history.

(56) References Cited

U.S. PATENT DOCUMENTS

| | | | |
|---|---|---|---|
| 5,045,795 A | 9/1991 | Gianzero et al. | |
| 5,867,806 A | 2/1999 | Strickland | |
| 6,181,138 B1 | 1/2001 | Hagiwara et al. | |
| 6,297,639 B1 | 10/2001 | Clark et al. | |
| 6,476,609 B1 | 11/2002 | Bittar | |
| 6,509,738 B1 | 1/2003 | Minerbo et al. | |
| 6,556,015 B1 | 4/2003 | Omeragic et al. | |
| 6,566,881 B2 | 5/2003 | Omeragic et al. | |
| 6,573,722 B2 | 6/2003 | Rosthal et al. | |
| 6,819,110 B2 | 11/2004 | Omeragic et al. | |
| 6,836,218 B2 | 12/2004 | Frey et al. | |
| 6,903,553 B2 | 6/2005 | Itskovich et al. | |
| 6,911,824 B2 | 6/2005 | Bittar | |
| 6,937,022 B2 | 8/2005 | Itskovich et al. | |
| 6,969,994 B2 | 11/2005 | Minerbo et al. | |
| 6,998,844 B2 | 2/2006 | Omeragic et al. | |
| 7,003,401 B2 | 2/2006 | Haugland | |
| 7,019,528 B2 | 3/2006 | Bittar | |
| 7,038,457 B2 | 5/2006 | Chen et al. | |
| 7,057,392 B2 | 6/2006 | Wang et al. | |
| 7,138,803 B2 | 11/2006 | Bittar | |
| 7,202,670 B2 | 4/2007 | Omeragic et al. | |
| 7,265,552 B2 | 9/2007 | Bittar | |
| 7,269,515 B2 | 9/2007 | Tabarovsky et al. | |
| 7,274,991 B2 | 9/2007 | Tabarovsky et al. | |
| 7,286,091 B2 | 10/2007 | Chen et al. | |

(Continued)

OTHER PUBLICATIONS

Fang, S., et al.; "Determination of structural dip and azimuth from LWD azimuthal propagation resistivity measurements in anisotropic formations". 2008 SPE Annual Technical Conference and Exhibition, Denver, CO, Sep. 21-24, 2008.

(Continued)

*Primary Examiner* — Aditya Bhat
(74) *Attorney, Agent, or Firm* — Kenneth Liu; Jeremy Berman

(57) ABSTRACT

A method for estimating at least one formation parameter from a directional resistivity measurement includes computing a plurality of hypothetical directional resistivity values at a corresponding plurality of formation parameter values. The computation makes use of a forward model having at least one analytical expression that relates a directional resistivity measurement to the formation parameter. The analytical expression includes at least one image source term. Comparison of computed directional resistivity values with measured direct resistivity values enables a value of at least one formation parameter to be selected. The method may be implemented on a downhole processor.

20 Claims, 13 Drawing Sheets

(56) References Cited

U.S. PATENT DOCUMENTS

| | | |
|---|---|---|
| 7,345,487 B2 | 3/2008 | Bittar et al. |
| 7,353,613 B2 | 4/2008 | Bartel et al. |
| 7,382,135 B2 | 6/2008 | Li et al. |
| 7,385,400 B2 | 6/2008 | Moore |
| 7,414,407 B2 | 8/2008 | Wang et al. |
| 7,436,184 B2 | 10/2008 | Moore |
| 7,463,035 B2 | 12/2008 | Merchant et al. |
| 7,471,088 B2 | 12/2008 | Yu et al. |
| 7,483,793 B2 | 1/2009 | Wang |
| 8,275,592 B2 * | 9/2012 | Lovatini et al. ............... 703/10 |
| 2008/0068022 A1 | 3/2008 | Peter et al. |
| 2008/0074336 A1 | 3/2008 | Signorelli et al. |
| 2008/0078580 A1 | 4/2008 | Bittar |
| 2008/0158082 A1 | 7/2008 | Wang et al. |
| 2008/0246486 A1 | 10/2008 | Forgang et al. |
| 2008/0290873 A1 | 11/2008 | Homan et al. |
| 2009/0015261 A1 | 1/2009 | Yang et al. |
| 2009/0138202 A1 | 5/2009 | Tang et al. |
| 2009/0198447 A1 * | 8/2009 | Legendre et al. ............ 702/11 |

OTHER PUBLICATIONS

Li, Q., et al.; "New directional electromagnetic tool for proactive geosteering and accurate formation evaluation while drilling". SPWLA 46th Annual Logging Symposium, Jun. 26-29, 2005, pp. 1-16.

Lin, Yih-yih, et al.; "Inversion of Induction logging data using the least squares technique," SPWLA Twenty-fifth Annual Logging Symposium, Jun. 10-13, 1984, Paper AA.

Gianzero, S., et al.; "A new resistivity tool for measurement-while-drilling", SPWLA Twenty-sixth Annual Logging Symposium, Jun. 17-20, 1985, Paper A.

Bannister, Peter, R.; Extension of quasi-static range finitely conducting earth-image theory techniques to other ranges, IEEE Transactions on Antennas and Propagation, vol. AP-26, No. 3, 1978, pp. 507-508.

Bannister, Peter, R.; "Summary of image theory expressions for the quasi-static fields of antennas at or above the earth's surface" Proceedings IEEE, vol. 67, No. 7, 1979, pp. 1001-1008.

Omeragic, D., et al.; "Deep directional electromagnetic measurements for optimal well placement" 2005 Annual Technical Conference and Exhibition held in Dallas, TX Oct. 9-12, 2005, SPE 97045.

* cited by examiner

METHOD OF DIRECTIONAL RESISTIVITY LOGGING

RELATED APPLICATIONS

None.

FIELD OF THE INVENTION

The present invention relates generally to methods for making subterranean directional resistivity measurements. More particularly, the present invention relates to an inversion methodology that makes use of an analytical expression including at least one image source term.

BACKGROUND OF THE INVENTION

The use of electrical measurements in prior art downhole applications, such as logging while drilling (LWD), measurement while drilling (MWD), and wireline logging applications is well known. Such techniques may be utilized to determine a subterranean formation resistivity, which, along with formation porosity measurements, is often used to indicate the presence of hydrocarbons in the formation. For example, it is known in the art that porous formations having a high electrical resistivity often contain hydrocarbons, such as crude oil, while porous formations having a low electrical resistivity are often water saturated. It will be appreciated that the terms resistivity and conductivity are often used interchangeably in the art. Those of ordinary skill in the art will readily recognize that these quantities are reciprocals and that one may be converted to the other via simple mathematical calculations. Mention of one or the other herein is for convenience of description, and is not intended in a limiting sense.

Directional resistivity measurements are also commonly utilized to provide information about remote geological features (e.g., remote beds, bed boundaries, and/or fluid contacts) not intercepted by the measurement tool. Such information includes, for example, the distance from and direction to the remote feature. In geosteering applications, directional resistivity measurements may be utilized in making steering decisions for subsequent drilling of the borehole. For example, an essentially horizontal section of a borehole may be routed through a thin oil bearing layer. Due to the dips and faults that may occur in the various layers that make up the strata, the distance between a bed boundary and the drill bit may be subject to change during drilling. Such distance (and direction) measurements may enable the operator to adjust the drilling course so as to maintain the bit at some predetermined distance from the boundary layer. Directional resistivity measurements also enable valuable geological information to be estimated, for example, including the dip and strike angles of the boundary as well as the vertical and horizontal conductivities of the formation.

In prior art geosteering operations, steering decisions are generally made at the surface, e.g., at the rig site or at some remote location, where there is significantly greater processing capability. LWD directional resistivity data (or other downhole data) are compressed downhole and then transmitted to the surface while drilling (e.g., via conventional telemetry techniques). The transmitted data is then processed at the surface in combination with a model of the subterranean formations to determine a subsequent drilling direction (or a correction to the current drilling direction). Changes to the predetermined (preplanned) drilling direction (e.g., in the form of a corrected well path) are then transmitted from the surface to a downhole steering tool (e.g., via conventional downlinking techniques) where they are implemented.

While geosteering methods have been commercially utilized for a number of years, there remains room for improvement. For example, the viability of prior art geosteering methods is often limited by the bandwidth and accuracy of the communication channel between the bottom hole assembly (BHA) and the surface. This limitation can cause geosteering methods to be slow and somewhat unresponsive (e.g., due to the time lag associated with transmitting LWD measurements to the surface and then transmitting steering instructions or a corrected well plan from the surface to the BHA). Moreover, telemetry errors and/or the reduced accuracy that results from data compression can lead to further errors when computing the corrected well path.

One way to overcome these limitations is to process the directional resistivity data downhole. However, prior art forward modeling and inversion algorithms tend to require intensive processing capability and are therefore generally unsuitable for use with low power downhole processors. There is therefore a need in the art for a fast inversion methodology that significantly reduces processing requirements.

SUMMARY OF THE INVENTION

The present invention addresses the above-described need for an improved inversion methodology for making directional resistivity measurements during downhole drilling operations. Aspects of this invention include computing a plurality of hypothetical directional resistivity values at a corresponding plurality of formation parameter values. The computation makes use of a forward model having at least one analytical expression that relates a directional resistivity measurement to the formation parameter. The analytical expression includes at least one image source term. Comparison of computed directional resistivity values with measured direct resistivity values enables a value of at least one formation parameter to be selected. The method may be implemented on a downhole processor.

Exemplary embodiments of the present invention may advantageously provide several technical advantages. For example, the present invention advantageously provides a fast inversion methodology that may be utilized on board a conventional downhole processor. Exemplary embodiment of the invention may reduce inversion processing time by a factor of 50 or more. Moreover the method may be used to compute a sensitivity matrix (e.g., a Jacobin matrix) for post-processing inversion which may further decrease the inversion processing time.

Moreover, one exemplary embodiment of the present invention provides a one-dimensional forward model for a complex three-layer formation geometry in which upper and lower boundaries are non-parallel. Such a formation structure can not generally be forward modeled using prior art one-dimensional models and therefore tends to require a highly processing intensive three-dimensional forward model. Such three-dimensional models are generally not considered to be suitable for use in real-time drilling operations. The present invention therefore advantageously provides a fast inversion methodology even for complex formation geometries.

In one aspect the present invention includes a method for estimating a value of at least a first formation parameter from a directional resistivity measurement. A forward model of a subterranean formation is acquired. The forward model includes at least one analytical expression relating a directional resistivity measurement to at least the first formation parameter, wherein the analytical expression includes at least one image source term. A processor (e.g., a downhole processor) computes a plurality of hypothetical directional resistivity measurements for a corresponding plurality of values of the first formation parameter. The method further includes acquiring at least one directional resistivity measurement and selecting a value of at least the first formation parameter for which the computed hypothetical directional resistivity measurement substantially matches the acquired directional resistivity measurement.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
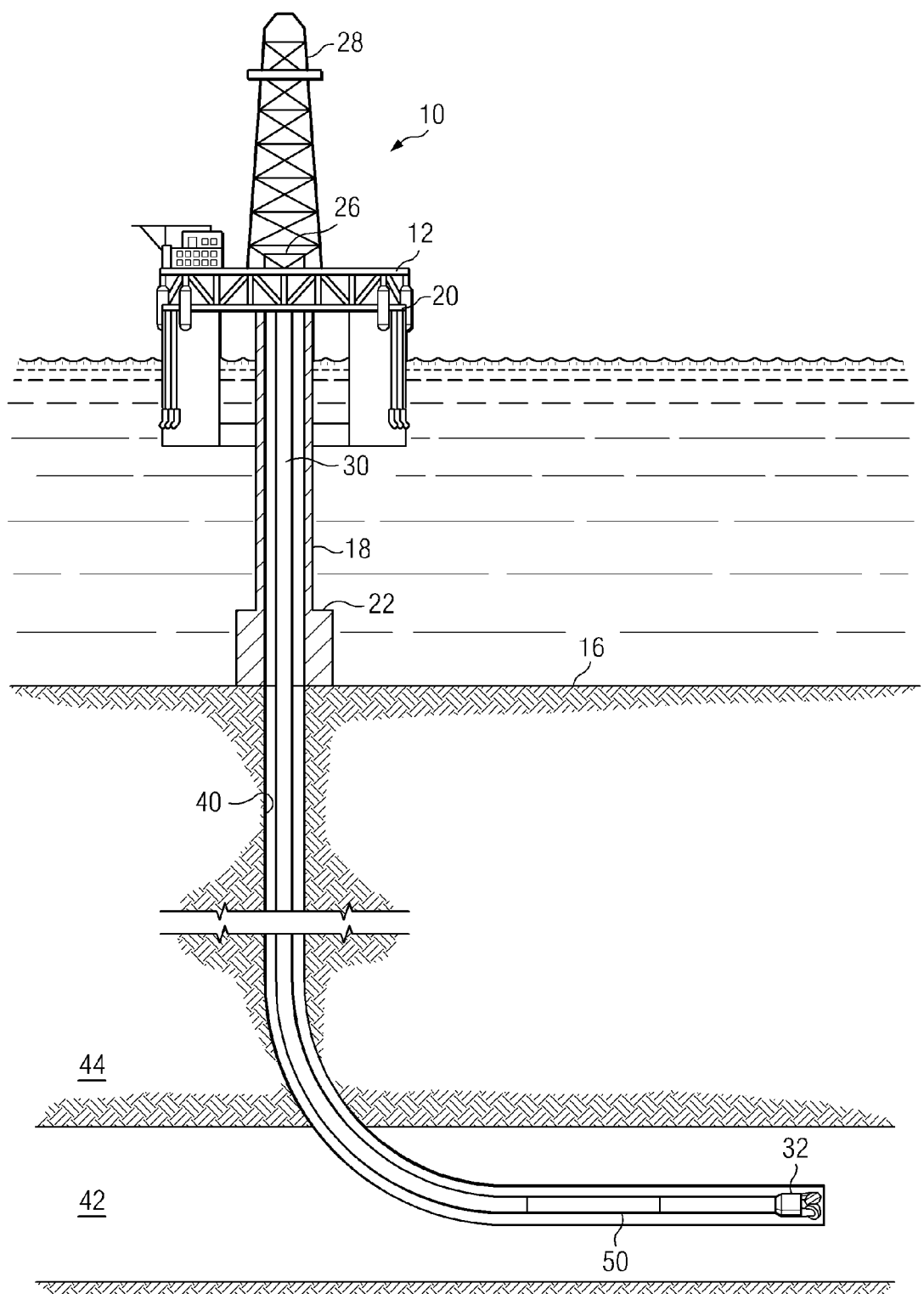
FIG. 1 depicts a conventional drilling rig on which exemplary method embodiments of the present invention may be utilized.

FIG. 1 depicts an exemplary offshore drilling assembly, generally denoted 10, suitable for employing exemplary method embodiments in accordance with the present invention. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32 and a directional resistivity logging tool 50. Drill string 30 may optionally further include substantially any number of other downhole tools including, for example, other measurement while drilling or logging while drilling tools (referred to herein collectively as MLWD tools), stabilizers, a rotary steerable tool, and a downhole drilling motor.

It will be understood by those of ordinary skill in the art that the deployment illustrated on FIG. 1 is merely exemplary. It will be further understood that exemplary embodiments in accordance with the present invention are not limited to use with a semisubmersible platform 12 as illustrated on FIG. 1. The invention is equally well suited for use with any kind of subterranean drilling operation, either offshore or onshore. While FIG. 1 depicts a drilling operation, it will also be understood that the invention is not limited to MLWD methods, but may also be utilized in wireline operations.

In the development of subterranean reservoirs, drilling operators commonly attempt to drill a section of the borehole at a predetermined distance from a bed boundary or a fluid contact within the reservoir. Those of ordinary skill in the art will readily appreciate that directional resistivity LWD measurements are commonly utilized to provide information about remote geological targets not intercepted by the measurement tool (e.g., the location of remote beds 44 and 46). Such information may include, for example, the distance between the LWD tool and the remote bed (or beds). The directional resistivity measurements may also be utilized to provide information about the physical properties of the near bed 42 (the bed in which the tool 100 resides) and the remote bed or beds 44 and 46.

Figure 2A:
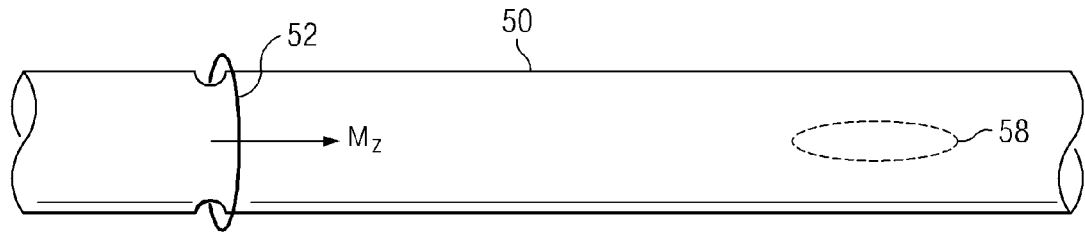
FIGS. 2A and 2B schematically depict exemplary directional resistivity tool embodiments suitable for use with the present invention.
Figure 2B:
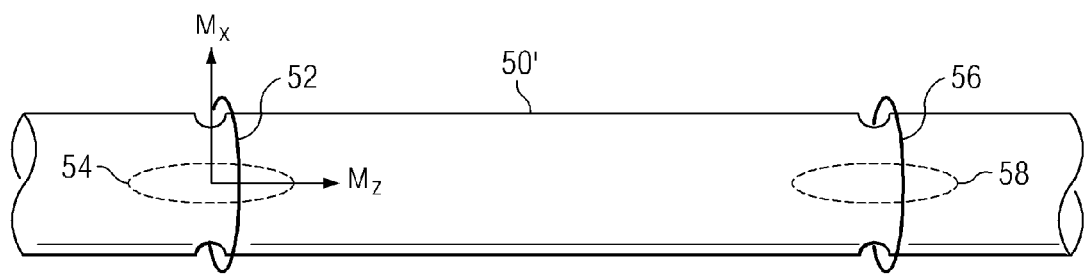

FIGS. 2A and 2B (collectively FIG. 2) depict exemplary directional resistivity tools 50 and 50' suitable for acquiring directional resistivity measurements that may then be further processed in accordance with the present invention. Resistivity tool 50 (FIG. 2A) includes at least one axial transmitting antenna 52 deployed about the tool body. In the depicted reference frame, an "axial antenna" is one in which the magnetic moment of the antenna M, is coincident with the tool axis. Logging tool 50 further includes at least one transverse receiving antenna 58. A "transverse antenna" is one in which the magnetic moment of the antenna is orthogonal to the tool axis. In the exemplary embodiment depicted on FIG. 2A, the receiving antennae 52 and 58 are longitudinally spaced on the tool body. Those of ordinary skill in the art will readily appreciate that logging tool 50 is configured to measure the $H_{ZX}$ cross coupling component (where the first index indicates the mode of the transmitter and the second index indicates the mode of the receiver).

FIG. 2B depicts a tool embodiment 50' including first and second collocated axial and transverse transmitting antennae 52 and 54 and first and second collocated axial and transverse receiving antennae 56 and 58. In the depicted reference frame, the axial and transverse antennae have magnetic moments $M_Z$ and $M_X$ that are coincident and transverse with the tool axis. Those of ordinary skill in the art will readily appreciate that logging tool 50' is configured to measure the $H_{ZX}$ and $H_{XZ}$ cross coupling components as well as the $H_{ZZ}$ and $H_{XX}$ coupling components.

Figure 3:
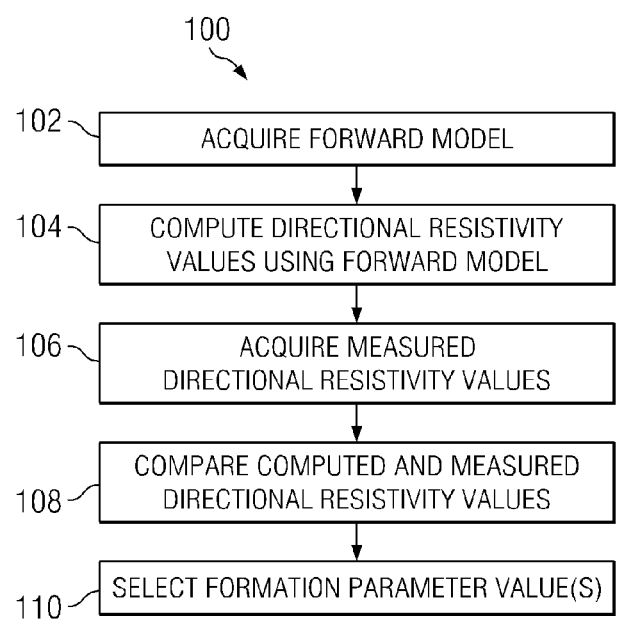
FIG. 3 depicts a flow chart of one exemplary method embodiment in accordance with the present invention.

FIG. 3 depicts a flow chart of one exemplary method embodiment 100 in accordance with the present invention. Method 100 includes a method for estimating a formation parameter from acquired directional resistivity measurements. The parameter may include, for example, at least one distance to a remote bed. A forward model of a subterranean formation is acquired at 102. The forward model includes at least one analytical expression relating a directional resistivity measurement (e.g., the aforementioned $H_{ZX}$ and $H_{XZ}$ cross coupling components and/or the $H_{XX}$ and $H_{ZZ}$ coupling component) to various formation parameters (e.g., distance to a remote bed). The analytical expression includes at least one image source term. Such image source terms are described in more detail below. At 104 a processor utilizes the analytical expression(s) to compute a plurality of hypothetical directional resistivity measurements at a corresponding plurality of formation parameter values. The processor is preferably deployed downhole as is also described in more detail below. At least one directional resistivity measurement is acquired at 106 and compared at 108 with the hypothetical directional resistivity measurements computed at 104. At 110, the processor selects the formation parameter value(s) for which the corresponding hypothetical directional resistivity measurements computed at 104 substantially match (or are within predetermined limits of) the directional resistivity measurements acquired at 106.

FIGS. 4-7 depict exemplary two-layer and three-layer forward models of a subterranean formation for the purposes of describing exemplary embodiments of the invention. One aspect of the present invention is the realization that the portion of the transmitted electromagnetic wave that reflects off of the remote boundary and back to the receivers may be thought of as being generated by an image transmitter (also referred to herein as an image source) located on an opposing side of the boundary. By the superposition principle, a received waveform may then be thought of as being a sum of the individual waveforms transmitted by the real source (the real transmitter located in the borehole) and the image source (the image transmitter located on the opposing side of the boundary) as is represented mathematically below:

$$H = = H_{IMAGE} + H_{REAL} \quad (1)$$

where H represents the received electromagnetic wave, $H_{IMAGE}$ represents at least one image source term, i.e., the portion of the received wave emanating from the image source, and $H_{REAL}$ represents at least one real source term, i.e., the portion of the received waves emanating from the real source.

Figure 4:
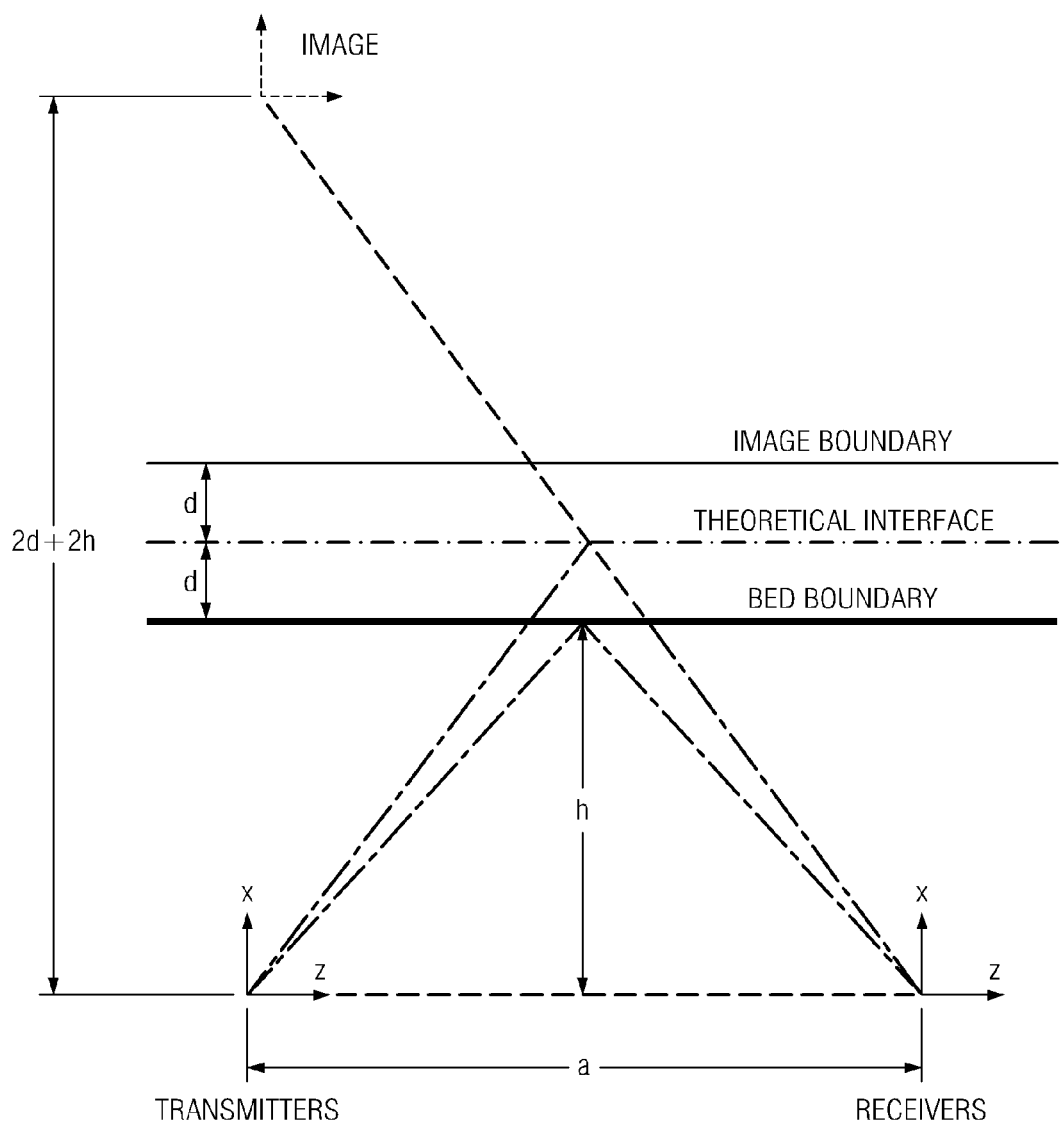
FIG. 4 depicts a two-layer formation model in which a logging tool is substantially parallel with a formation boundary.

FIG. 4 depicts a two-layer forward model in which a logging tool is substantially parallel with a remote bed boundary. A logging tool (e.g., logging tool 50') is depicted as being deployed in a near bed 42 offset by a distance h from an upper remote bed 44 (also referred to as a far bed). In the analysis that follows both the tool body and antennae diameters are neglected such that the transmitters and receivers are considered to be point dipole sources. A theoretical interface is depicted as being offset from the boundary between the near and far beds by a complex valued distance d. The real portion of d is depicted while the imaginary portion of the distance d accounts for wave absorption by the far bed. The image source (i.e., the image of the transmitters as described above) is depicted as being located symmetrically about the theoretical interface from the real source. The complex valued distance d is related to the electromagnetic propagation constants of the two media (the near and far beds), for example as follows:

$$d_{TE} = \frac{1}{\sqrt{k_n^2 - k_f^2}} \quad (2)$$

$$d_{TM} = \frac{\sqrt{k_n^2 - k_f^2}}{-k_f^2}$$

$$k_n^2 = \omega^2 \mu_m \varepsilon_n - j\omega\mu\sigma_n \text{ --- wavenumber in near bed}$$

$$k_f^2 = \omega^2 \mu_f \varepsilon_f - j\omega\mu\sigma_f \text{ --- wavenumber in far bed}$$

where $d_{TE}$ represents the complex distance for the transverse electric (TE) mode, $d_{TM}$ represents the complex distance for the transverse magnetic (TM) mode, $\omega$ represents the frequency of the transmitted wave in radians, $\mu_n$ and $\mu_f$ represent the permeability of the near and far beds, $\epsilon_n$ and $\epsilon_f$ represent the permittivity of the near and far beds, and $\sigma_n$ and $\sigma_f$ represent the conductivity of the near and far beds.

It will be understood by those of ordinary skill in the art, for the geometry depicted on FIGS. 4-7 that each of the x- and z-mode polarized dipoles (both of which are in the plane of the figure) generate a TE mode. A y-mode polarized dipole (which is orthogonal to the plane of the figure) generates a TM mode.

With continued reference to the two-layer model depicted on FIG. 4, analytical expressions for the $H_{ZZ}$ coupling component and the $H_{ZX}$ cross-coupling component (each of which is obtained from a z-mode transmission) may be derived, for example, as follows:

$$H_{ZZ} = \frac{M_Z}{4\pi} \left\{ \underbrace{\frac{e^{-jk_n r}}{4\pi}(k_n^2 r^2 - 3jk_n r - 3)(2d + 2h)^2 + \frac{2e^{-jk_n r}}{r^3}(jk_n r + 1)}_{\text{from image source}} \right\} + \quad (3)$$

$$\underbrace{\frac{M_Z}{4\pi} \frac{2e^{-jk_n a}}{a^3}(jk_n a + 1)}_{\text{from real source}}$$

$$H_{ZX} = \underbrace{\frac{M_Z}{4\pi} \frac{e^{-jk_n r}}{r^5}(k_n^2 r^2 - 3jk_n r - 3)(2d + 2h)a}_{\text{from image source}}$$

where $M_Z$ represents the dipole moment of the z-mode transmitter, a represents the axial distance between the z-mode transmitter and the x- and z-mode receivers, r represents the distance between the image source and the receivers such that in FIG. 4 $r = \sqrt{(2d+2h)^2 + a^2}$, $d = d_{TE}$ as given in Equation (2), and $k_n$ is the wave number of the near bed as defined above. Note that the expression for the $H_{ZZ}$ coupling component includes first and second terms, the first term being derived from the image source and the second term being derived from the real source. The expression for the $H_{ZX}$ cross-coupling component includes a single term derived from the image source (the contribution from the real source equals zero).

Analytical expressions for the $H_{XX}$ coupling component and the $H_{XZ}$ cross-coupling component (each of which is obtained from an x-mode transmission) may given, for example, as follows:

$$H_{XX} = \frac{M_X}{4\pi}\underbrace{\left\{\frac{e^{-jk_n r}}{r^5}(k_n^2 r^2 - 3jk_n r - 3)(2d+2h)^2 - \frac{e^{-jk_n r}}{r^3}(k_n^2 r^2 - jk_n r - 1)\right\}}_{\text{from image source}} + \quad (4)$$

$$\underbrace{\frac{M_X}{4\pi}\frac{e^{-jk_n a}}{a^3}(k_n^2 a^2 - jk_n a - 1)}_{\text{from real source}}$$

$$H_{XZ} = -\frac{M_X}{4\pi}\underbrace{\frac{e^{-jk_n r}}{r^5}(k_n^2 r^2 - 3jk_n r - 3)(2d+2h)a}_{\text{from image source}}$$

where $M_X$ represents the dipole moment of the x-mode transmitter and a, r, d, and $k_n$ are as defined above with respect to Equation (3). Note again that the expression for the $H_{XX}$ coupling component includes first and second terms, the first term being derived from the image source and the second term being derived from the real source. The expression for the $H_{XZ}$ cross-coupling component includes a single term derived from the image source (the contribution from the real source equals zero).

An analytical expression for a $H_{YY}$ coupling component may also be derived using the schematic depicted on FIG. 4. Those of ordinary skill in the art will readily appreciate that the y-direction is orthogonal to the plane of the figure and that $H_{YY}$ may be obtained by simply rotating the tool 50' one quarter turn (90 degrees) about its axis and following the same procedure as is used to measure $H_{XX}$. Alternatively, the logging tool may include an additional y-mode transmitter and receiver. The $H_{YY}$ coupling component may be expressed mathematically, for example, as follows:

$$H_{YY} = \frac{M_Y}{4\pi}\underbrace{\left\{\frac{e^{-jk_n r}}{r^3}(k_n^2 r^2 - jk_n r - 1)\right\}}_{\text{from image source}} + \underbrace{\frac{M_Y}{4\pi}\frac{e^{-jk_n a}}{a^3}(k_n^2 a^2 - jk_n a - 1)}_{\text{from real source}} \quad (5)$$

where $M_Y$ represents the dipole moment of the y-mode transmitter, $d=d_{TM}$ as is defined above in Equation (2), and a, r, and $k_n$ are as defined above with respect to Equation (2). The expression for the $H_{YY}$ coupling component is similar to those for the $H_{ZZ}$ and $H_{XX}$ coupling components in that it includes a first term being derived from the image source and a second term being derived from the real source.

Figure 5:
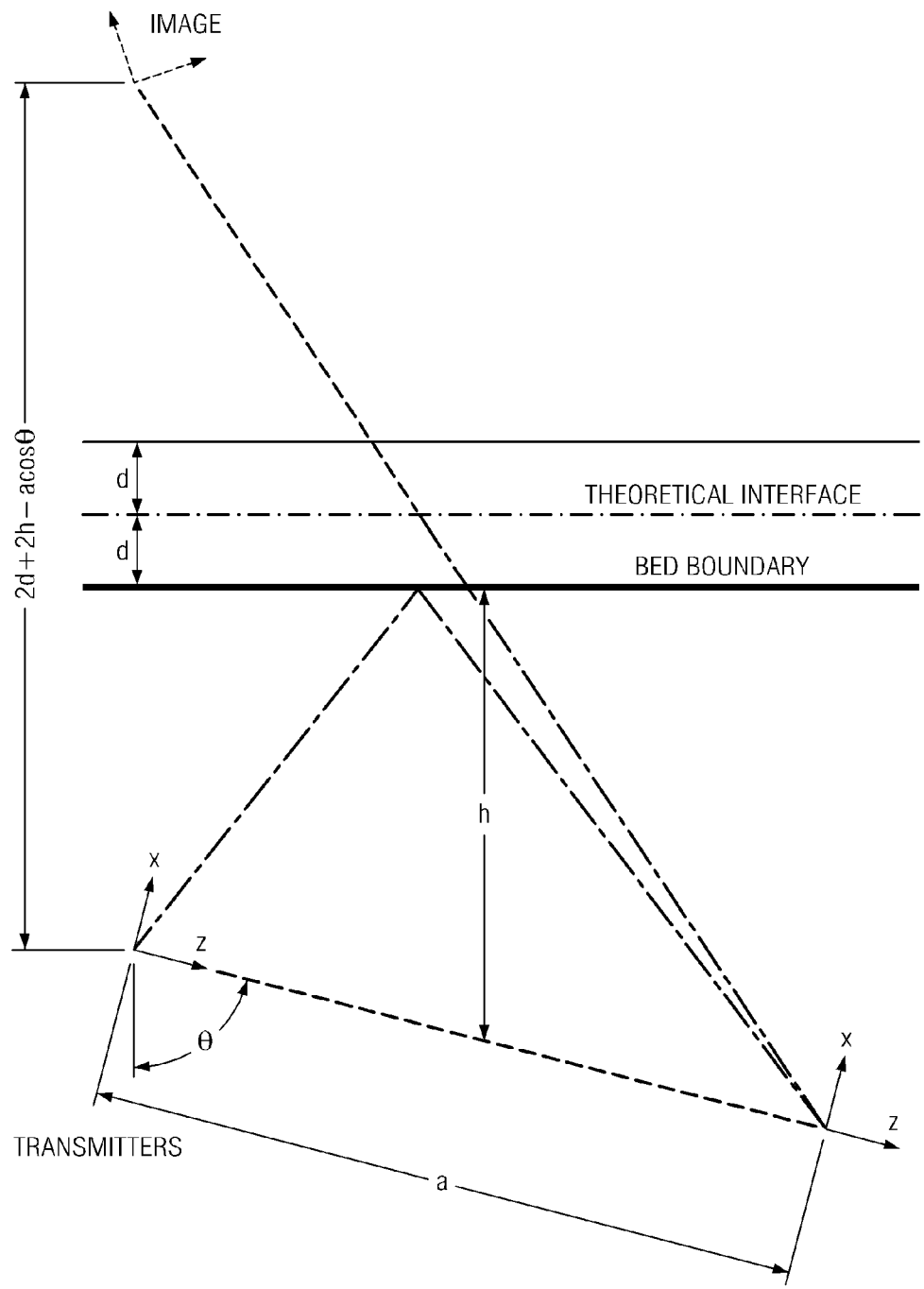
FIG. 5 depicts a two-layer formation model in which a logging tool is inclined with respect to a formation boundary.

FIG. 5 depicts a more general case of a two-layer model in which the logging tool 50' is inclined (i.e., not parallel) with respect to the boundary between the near 42 and far 44 beds. The dip angle θ is defined as it is conventionally defined in the industry. By such convention the tool and boundary are parallel when θ equals 90 degrees and orthogonal to one another when θ equals 0 or 180 degrees. Mathematical expressions for the coupling and cross-coupling components may be derived using the superposition principle as described above with respect to FIG. 4.

Analytical expressions for the $H_{ZZ}$ coupling component and the $H_{ZX}$ cross-coupling component may given, for example, as follows:

$$H_{ZZ} = \quad (6)$$

$$\frac{M_Z}{4\pi}\underbrace{\left\{\frac{e^{-jk_n r}}{r^5}(k_n^2 r^2 - 3jk_n r - 3)(2d+2h)^2 - \frac{e^{-jk_n r}}{r^3}(k_n^2 r^2 + jk_n r + 1)\cos^2\theta + \frac{2e^{-jk_n r}}{r^3}(jk_n r + 1)\right\}}_{\text{from image source}}$$

$$+\underbrace{\frac{M_Z}{4\pi}\frac{2e^{-jk_n a}}{a^3}(jk_n a + 1)}_{\text{from real source}}$$

$$H_{ZX} = \frac{M_Z}{4\pi}\underbrace{\left\{\frac{e^{-jk_n r}}{r^5}(k_n^2 r^2 - 3jk_n r - 3)(2d+2h)a\sin\theta + \frac{e^{-jk_n r}}{r^3}(k_n^2 r^2 + jk_n r + 1)\sin\theta\cos\theta\right\}}_{\text{from image source}}$$

where $r=\sqrt{(2d+2h-a\cos\theta)^2+(a\sin\theta)^2}$ and $M_Z$, a, d, and $k_n$ are as defined above with respect to Equation (3).

Analytical expressions for the $H_{XX}$ coupling component and the $H_{XZ}$ cross-coupling component may given, for example, as follows:

$$H_{XX} = \tag{7}$$
$$\underbrace{\frac{M_X}{4\pi}\left\{\frac{e^{-jk_n r}}{r^5}(k_n^2 r^2 - 3jk_n r - 3)(2d+2h)^2 - \frac{e^{-jk_n r}}{r^3}(k_n^2 r^2 + jk_n r + 1)\sin^2\theta + \frac{2e^{-jk_n r}}{r^3}(jk_n r + 1)\right\}}_{\text{from image source}}$$
$$+ \underbrace{\frac{M_X}{4\pi}\frac{e^{-jk_n a}}{a^3}(k_n^2 a^2 - jk_n a - 1)}_{\text{from real source}}$$

$$H_{XZ} = \underbrace{\frac{M_X}{4\pi}\left\{-\frac{e^{-jk_n r}}{r^5}(k_n^2 r^2 - 3jk_n r - 3)(2d+2h)a\sin\theta + \frac{e^{-jk_n r}}{r^3}(k_n^2 r^2 + jk_n r + 1)\sin\theta\cos\theta\right\}}_{\text{from image source}}$$

where r is as defined above in Equation (6), and $M_X$, a, d, and $k_n$ are as defined above with respect to Equation (4).

An analytical expression for the $H_{YY}$ coupling component may be expressed mathematically, for example, as follows:

$$H_{YY} = \underbrace{\frac{M_Y}{4\pi}\left\{\frac{e^{-jk_n r}}{r^3}(k_n^2 r^2 - jk_n r - 1)\right\}}_{\text{from image source}} + \underbrace{\frac{M_Y}{4\pi}\frac{e^{-jk_n a}}{a^3}(k_n^2 a^2 - jk_n a - 1)}_{\text{from real source}} \tag{8}$$

where r is as defined above in Equation (6), and $M_Y$, a, d, and $k_n$ are as defined above with respect to Equation (5). The expressions for the $H_{XX}$, $H_{YY}$, and $H_{ZZ}$ coupling components and the $H_{ZX}$ and $H_{XZ}$ cross-coupling components given in Equations (6), (7), and (8) are similar to those given above in Equations (3), (4), and (5) in that each includes at least a first term derived from an image source. The expressions for the coupling components also include a second term derived from the real source. Those of ordinary skill in the art will also readily appreciate that the expressions given in Equations (6), (7), and (8) reduce to those given in Equation (3), (4), and (5) when the dip angle $\theta$ equals 90 degrees such that $\cos\theta=0$ and $\sin\theta=1$.

The two-layer forward models depicted on FIGS. 4 and 5 may be suitable for many directional resistivity logging and payzone steering drilling operations. For example, these models may be suitable for payzone steering operations in which the drilling plan calls for a well bore to be placed a substantially fixed distance below a boundary. However, in certain operations a more complex three-layer model may be required. For example, in operations in which the well bore is located near the midpoint between upper and lower boundaries or in operations in which the near bed is relatively thin, it may be advantageous to use a three-layer model.

Figure 6:
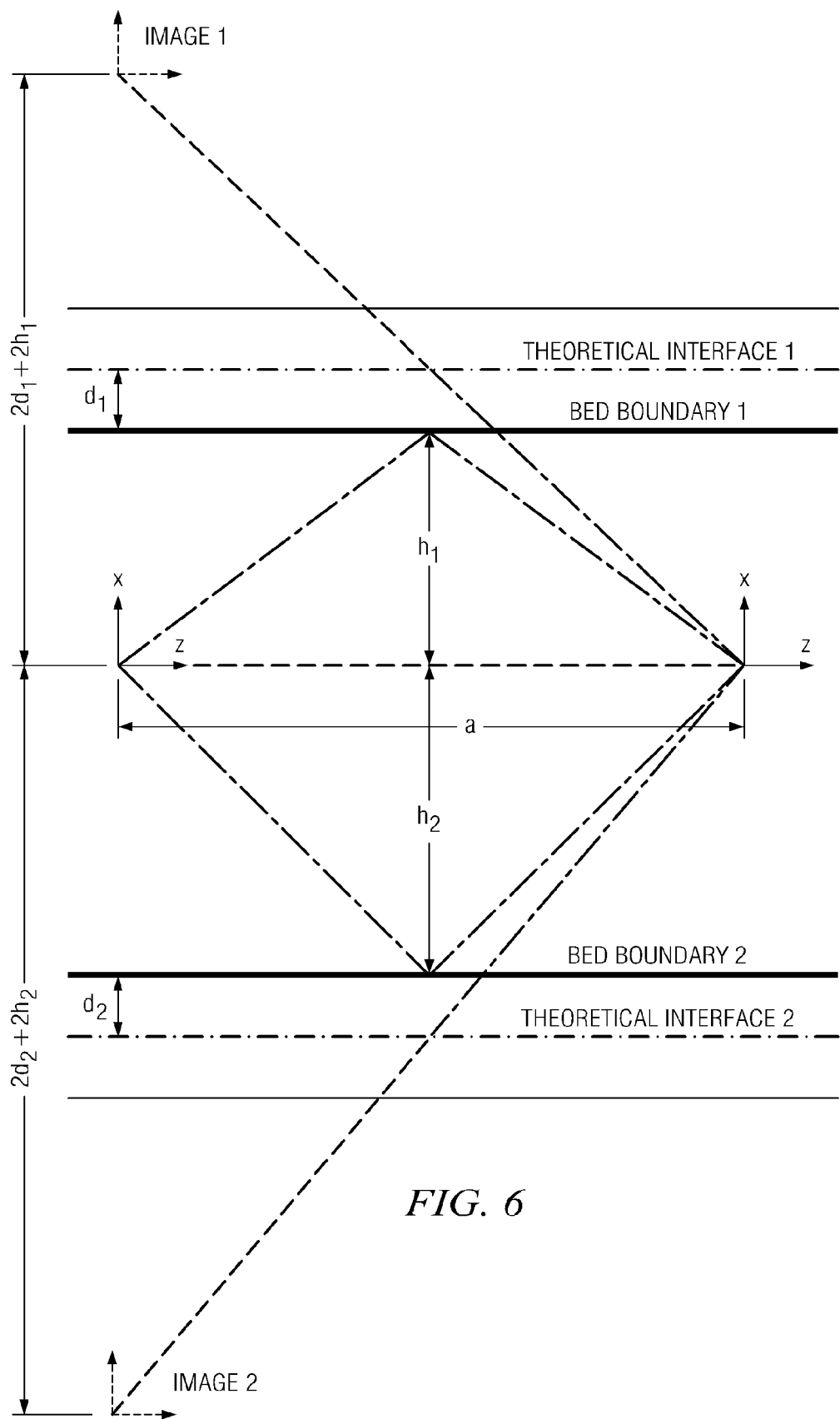
FIG. 6 depicts a three-layer formation model in which a logging tool is substantially parallel with first and second formation boundaries.

FIG. 6 depicts an exemplary three-layer forward model in which a logging tool 50' is deployed in a near bed 42 between and substantially parallel with first and second upper and lower formation boundaries. Logging tool 50' is depicted as being offset by a distance $h_1$ from the upper bed 44 and a distance $h_2$ from the lower bed 46. Upper and lower theoretical interfaces are depicted as being offset from the upper and lower boundaries by complex valued distances $d_1$ and $d_2$. As with the two-layer model depicted on FIG. 4, the real portions of $d_1$ and $d_2$ are depicted while the imaginary portions account for wave absorption by the upper and lower beds. Distances $d_1$ and $d_2$ may be computed as described above with respect to Equation (1).

FIG. 6 further depicts first and second image sources as being located symmetrically about the first and second theoretical interfaces from the real source. By the superposition principle, a received waveform may be thought of as being a sum of the individual waveforms transmitted by the real source (the real transmitter) and each of the image sources. Analytical expressions for the $H_{ZZ}$ coupling component and the $H_{ZX}$ cross-coupling component (each of which is obtained from a z-mode transmission) may be derived, for example, as follows:

$$H_{ZZ} = \underbrace{\frac{M_Z}{4\pi}\left\{\frac{e^{-jk_n r_1}}{r_1^5}(k_n^2 r_1^2 - 3jk_n r_1 - 3)(2d_1+2h_1)^2 + \frac{2e^{-jk_n r_1}}{r_1^3}(jk_n r_1 + 1)\right\}}_{\text{from image source 1}} + \tag{9}$$
$$\underbrace{\frac{M_Z}{4\pi}\left\{\frac{e^{-jk_n r_2}}{r_2^5}(k_n^2 r_2^2 - 3jk_n r_2 - 3)(2d_2+2h_2)^2 + \frac{2e^{-jk_n r_2}}{r_2^3}(jk_n r_2 + 1)\right\}}_{\text{from image source 2}} + \underbrace{\frac{M_Z}{4\pi}\frac{2e^{-jk_n a}}{a^3}(jk_n a + 1)}_{\text{from real source}}$$

$$H_{ZX} = \underbrace{\frac{M_Z}{4\pi}\left\{\frac{e^{-jk_n r_1}}{r_1^5}(k_n^2 r_1^2 - 3jk_n r_1 - 3)(2d_1+2h_1)a\right\}}_{\text{from image source 1}} + \underbrace{\frac{M_Z}{4\pi}\left\{-\frac{e^{-jk_n r_2}}{r_2^5}(k_n^2 r_2^2 - 3jk_n r_2 - 3)(2d_2+2h2)a\right\}}_{\text{from image source 2}}$$

where $r_1 = \sqrt{(2d_1+2h_1)^2+a^2}$, $r_2 = \sqrt{(2d_2+2h_2)^2+a^2}$, $d_1 = d_{1TE}$, $d_2 = d_{2TE}$, and $M_Z$, a, and $k_n$ are as defined above with respect to Equation (3).

Analytical expressions for the $H_{XX}$ coupling component and the $H_{XZ}$ cross-coupling component may given, for example, as follows:

$$H_{XX} = \frac{M_X}{4\pi} \underbrace{\left\{ \frac{e^{-jk_n r_1}}{r_1^5}(k_n^2 r_1^2 - 3jk_n r_1 - 3)(2d_1 + 2h_1)^2 - \frac{e^{-jk_n r_1}}{r_1^3}(k_n^2 r_1^2 - jk_n r_1 - 1) \right\}}_{\text{from image source 1}} + \qquad (10)$$

$$\underbrace{\frac{M_X}{4\pi}\left\{\frac{e^{-jk_n r_2}}{r_2^5}(k_n^2 r_2^2 - 3jk_n r_2 - 3)(2d_2 + 2h_2)^2 - \frac{e^{-jk_n r_2}}{r_2^3}(k_n^2 r_2^2 - jk_n r_2 - 1)\right\}}_{\text{from image source 2}} +$$

$$\underbrace{\frac{M_X}{4\pi}\frac{e^{-jk_n a}}{a^3}(k_n^2 a^2 - jk_n a - 1)}_{\text{from real source}}$$

$$H_{XZ} = \frac{M_X}{4\pi}\underbrace{\left\{-\frac{e^{-jk_n r_1}}{r_1^5}(k_n^2 r_1^2 - 3jk_n r_1 - 3)(2d_1 + 2h_1)a +\right.}_{\text{from image source 1}}$$

$$\underbrace{\frac{M_X}{4\pi}\left\{\frac{e^{-jk_n r_2}}{r_2^5}(k_n^2 r_2^2 - 3jk_n r_2 - 3)(2d_2 + 2h_2)a\right.}_{\text{from image source 2}}$$

where $r_1$, $r_2$, $d_1$, and $d_2$ are defined above with respect to Equation (9) and $M_X$, a, and $k_n$ are as defined above with respect to Equation (4).

An analytical expression for the $H_{YY}$ coupling component may be expressed mathematically, for example, as follows:

$$H_{YY} = \underbrace{\frac{M_Y}{4\pi}\left\{\frac{e^{-jk_n r_1}}{r_1^3}(k_n^2 r_1^2 - jk_n r_1 - 1)\right\}}_{\text{from image source 1}} + \qquad (11)$$

$$\underbrace{\frac{M_Y}{4\pi}\left\{\frac{e^{-jk_n r_2}}{r_2^3}(k_n^2 r_2^2 - jk_n r_2 - 1)\right\}}_{\text{from image source 2}} + \underbrace{\frac{M_Y}{4\pi}\frac{e^{-jk_n a}}{a^3}(k_n^2 a^2 - jk_n a - 1)}_{\text{from real source}},$$

where $r_1$ and $r_2$ are defined above with respect to Equation (9), $d_1 = d_{1\,TM}$, $d_2 = d_{2\,TM}$, and $M_Y$, a, and $k_n$ are as defined above with respect to Equation (5).

Figure 7:
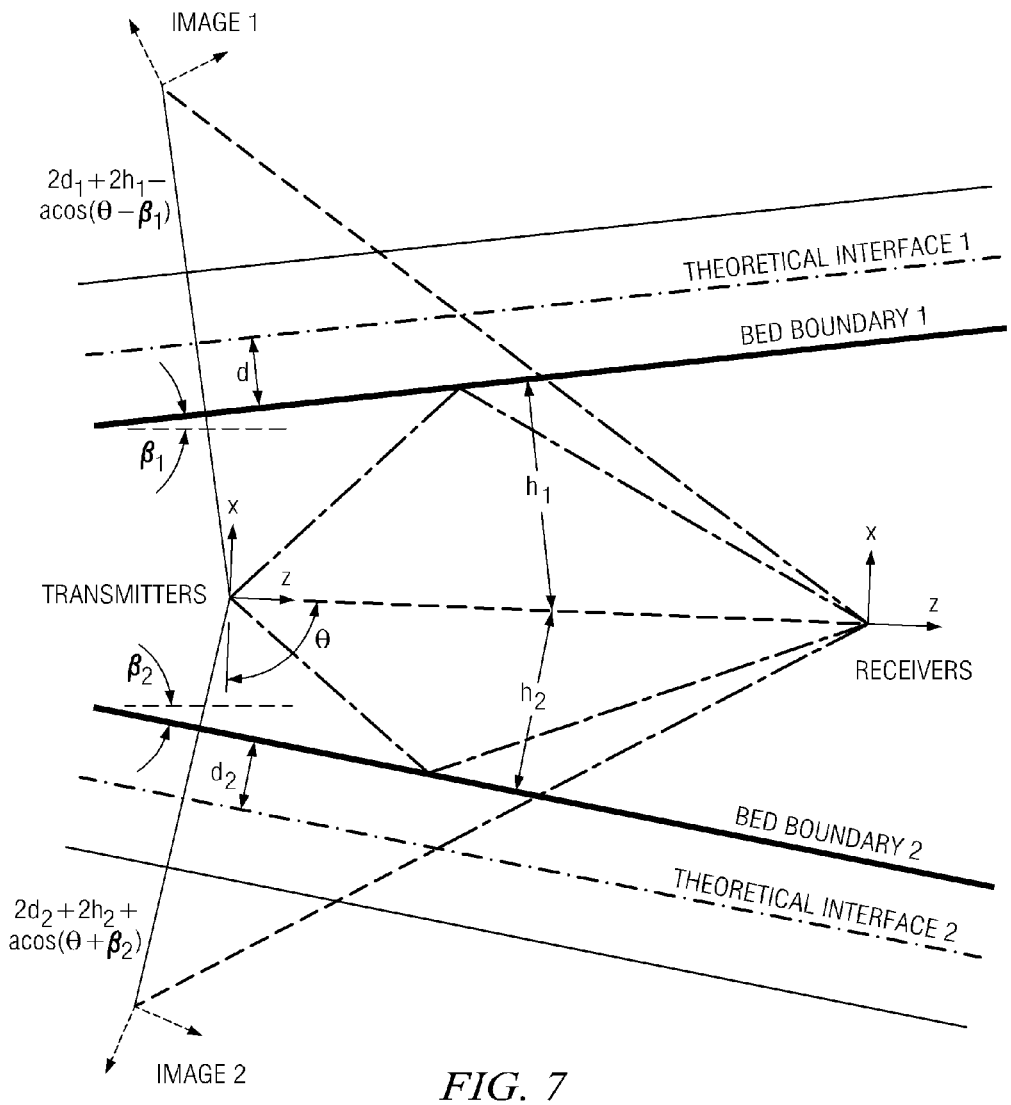
FIG. 7 depicts a three-layer formation model in which a logging tool is inclined with respect to first and second non-parallel formation boundaries.

FIG. 7 depicts a more general three-layer formation model in which a logging tool is inclined with respect to first and second non-parallel formation boundaries. The dip angle $\theta$ is described conventionally as described above with respect to FIG. 5. The dip angles of the upper and lower beds $\beta_1$ and $\beta_2$ are defined as depicted such that the boundaries are horizontal in the Earth's coordinate system when $\beta_1$ and $\beta_2$ equal zero. Those of ordinary skill will appreciate that $\beta_1$ is defined as being positive in a clockwise direction while $\beta_2$ is defined as being positive in a counterclockwise direction. According to these dip angle definitions, the relative dip angle between the logging tool and the upper boundary is $\theta - \beta_1$, while the relative dip angle between the logging tool and the lower boundary is $\theta + \beta_2$.

Mathematical expressions for the coupling and cross-coupling components may be derived using the superposition principle as described above with respect to FIG. 6. Analytical expressions for the $H_{ZZ}$ coupling component and the $H_{ZX}$ cross-coupling component may given, for example, as follows:

$$H_{ZZ} = \qquad (12)$$

$$\underbrace{\frac{M_Z}{4\pi}\left\{A_1(2d_1 + 2h_1)^2 - B_1\cos^2(\theta - \beta_1) + \frac{2e^{-jk_n r_1}}{r_1^3}(jk_n r_1 + 1)\right\}}_{\text{from image source 1}} +$$

$$\underbrace{\frac{M_Z}{4\pi}\left\{A_2(2d_2 + 2h_2)^2 - B_2\cos^2(\theta + \beta_2) + \frac{2e^{-jk_n r_2}}{r_2^3}(jk_n r_2 + 1)\right\}}_{\text{from image source 2}}$$

$$+ \underbrace{\frac{M_Z}{4\pi}\frac{2e^{-jk_n a}}{a^3}(jk_n a + 1)}_{\text{from real source}}$$

$$H_{ZX} = \underbrace{\frac{M}{4\pi}\{A_1(2d_1 + 2h_1)a\sin(\theta - \beta_1) + B_1\sin(\theta - \beta_1)\cos(\theta - \beta_1) +}_{\text{from image source 1}}$$

$$\underbrace{\frac{M}{4\pi}\{-A_2(2d_2 + 2h_2)a\sin(\theta + \beta_2) + \beta_2\sin(\theta + \beta_2)\cos(\theta + \beta_2)}_{\text{from image source 2}}$$

where:

$$A_1 = \frac{e^{-jk_n r_1}}{r_1^5}(k_n^2 r_1^2 - 3jk_n r_1 - 3),$$

$$A_2 = \frac{e^{-jk_n r_2}}{r_2^5}(k_n^2 r_2^2 - 3jk_n r_2 - 3)$$

$$B_1 = \frac{e^{-jk_n r_1}}{r_1^3}(k_n^2 r_1^2 + jk_n r_1 + 1),$$

$$B_2 = \frac{e^{-jk_n r_2}}{r_2^3}(k_n^2 r_2^2 + jk_n r_2 + 1)$$

and where $r_1 = \sqrt{(2d1 + 2h1 - a\cos(\theta - \beta_1))^2 + (a\sin(\theta - \beta_1))^2}$, $r_2 = \sqrt{(2d2 + 2h2 + a\cos(\theta + \beta_2))^2 + (a\sin(\theta + \beta_2))^2}$, $d_1$ and $d_2$ are defined with respect to Equation (9), and $M_Z$, a, and $k_n$ are as defined above with respect to Equation (3).

Analytical expressions for the $H_{XX}$ coupling component and the $H_{XZ}$ cross-coupling component may given, for example, as follows:

$$H_{XX} = \tag{13}$$

$$\underbrace{\frac{M_X}{4\pi}\left\{A_1(2d_1+2h_1)^2 - B_1\sin^2(\theta-\beta_1) + \frac{2e^{-jk_n r_1}}{r_1^3}(jk_n r_1 + 1)\right\}}_{\text{from image source 1}} +$$

$$\underbrace{\frac{M_X}{4\pi}\left\{A_2(2d_2+2h_2)^2 - B_2\sin^2(\theta+\beta_2) + \frac{2e^{-jk_n r_2}}{r_2^3}(jk_n r_2 + 1)\right\}}_{\text{from image source 2}}$$

$$+ \underbrace{\frac{M_X}{4\pi}\frac{e^{-jk_n a}}{a^3}(k_n^2 a^2 - jk_n a - 1)}_{\text{from real source}}$$

$$H_{XZ} = \underbrace{\frac{M_X}{4\pi}\{-A_1(2d_1+2h_1)a\sin(\theta-\beta_1) + B_1\sin(\theta-\beta_1)\cos(\theta-\beta_1) +}_{\text{from image source 1}}$$

$$\underbrace{\frac{M_X}{4\pi}\{A_2(2d_2+2h_2)a\sin(\theta+\beta_2) + \beta_2\sin(\theta+\beta_2)\cos(\theta+\beta_2)}_{\text{from image source 2}}$$

where $A_1$, $A_2$, $B_2$, $r_1$, and $r_2$ are defined with respect to Equation (12), $d_1$ and $d_2$ are defined with respect to Equation (9), and $M_X$, a, and $k_n$ are as defined with respect to Equation (4).

An analytical expression for the $H_{YY}$ coupling component may be expressed mathematically, for example, as follows:

$$H_{YY} = \underbrace{\frac{M_Y}{4\pi}\left\{\frac{e^{-jk_n r_1}}{r_1^3}(k_n^2 r_1^2 - jk_n r_1 - 1)\right\}}_{\text{from image source 1}} + \tag{14}$$

$$\underbrace{\frac{M_Y}{4\pi}\left\{\frac{e^{-jk_n r_2}}{r_2^3}(k_n^2 r_2^2 - jk_n r_2 - 1)\right\}}_{\text{from image source 2}} + \underbrace{\frac{M_Y}{4\pi}\frac{e^{-jk_n a}}{a^3}(k_n^2 a^2 - jk_n a - 1)}_{\text{from real source}},$$

where $r_1$ and $r_2$ are defined with respect to Equation (12), $d_1$ and $d_2$ are defined with respect to Equation (11), and $M_Y$, a, and $k_n$ are as defined with respect to Equation (5).

The expressions for the $H_{XX}$, $H_{YY}$, and $H_{ZZ}$ coupling components and the $H_{ZX}$ and $H_{XZ}$ cross-coupling components given in Equations (9) through (14) are similar to one another in that each includes at least first and second terms derived from the corresponding first and second image sources. The expressions for the coupling components each include at least a third term derived from the real image source. Those of ordinary skill in the art will also readily appreciate that the expressions given in Equations (12), (13), and (14) reduce to those given in Equation (9), (10), and (11) when $\theta-\beta_1=\theta+\beta_2=90$ degrees.

It will be understood that while FIGS. 6 and 7 depict only first order images that second order images may also be considered. Such second order images represent images of the first order images. For example, in FIG. 7, a second order image of image 1 about the lower theoretical boundary would be located well below first order image 2. A second order image of image 2 about the upper theoretical boundary would be located well above first order image 1. Since the contributions of the images are mathematically related to $1/r^3$ for the cross-components and $1/r^2$ for the coupling components, second order images can generally be ignored except possibly for a very thin near bed. Moreover, for the cross-components the contributions of the second order images cancel when $\theta-\beta_1=\theta+\beta_2=90$ degrees. Notwithstanding, those of ordinary skill in the art will readily be able to modify Equations (9) through (14) to include higher order (second, third, etc.) image contributions using the analysis described above.

Turning now to FIGS. 8 through 11, exemplary embodiments of the present invention are compared with prior art inversion methodologies. In these examples, a hypothetical measured voltage (in units of nV) is plotted with respect to the depth (in units of feet) of a measurement tool below an upper boundary. Those of ordinary skill in the art will readily appreciate that a measured voltage V is related to the magnetic field H as follows:

$$V = i\omega\mu H$$

A full-tensor Dipvolt code is used as the control in the examples shown on FIGS. 8 through 10. The Dipvolt code computes the Sommerfeld integrals derived from the Hertz vector potentials as is described in more detail in Lin et al, "*The Inversion of Induction Logging Data Using the Least Squares Technique*" *SPWLA, Paper AA,* 1984 and Gianzero, "*A New Resistivity Tool for Measurement While Drilling*" *SPWLA, Paper A,* 1985. A full three-dimensional forward model is utilized as the control in the example shown on FIG. 11.

FIGS. 8-11 depict the modeled quadrature and in-phase components of a hypothetical cross-coupling voltage measurement $V_{ZX}$ a function of depth for various forward modeling configurations (i.e., various two-layer and three-layer models). The solid and dotted lines represent the modeled quadrature and in-phase components computed using the present invention. The triangles ($\Delta$) and the circles ($\circ$) represent the modeled quadrature and in-phase components using the prior art control methodology.

Figure 8A:
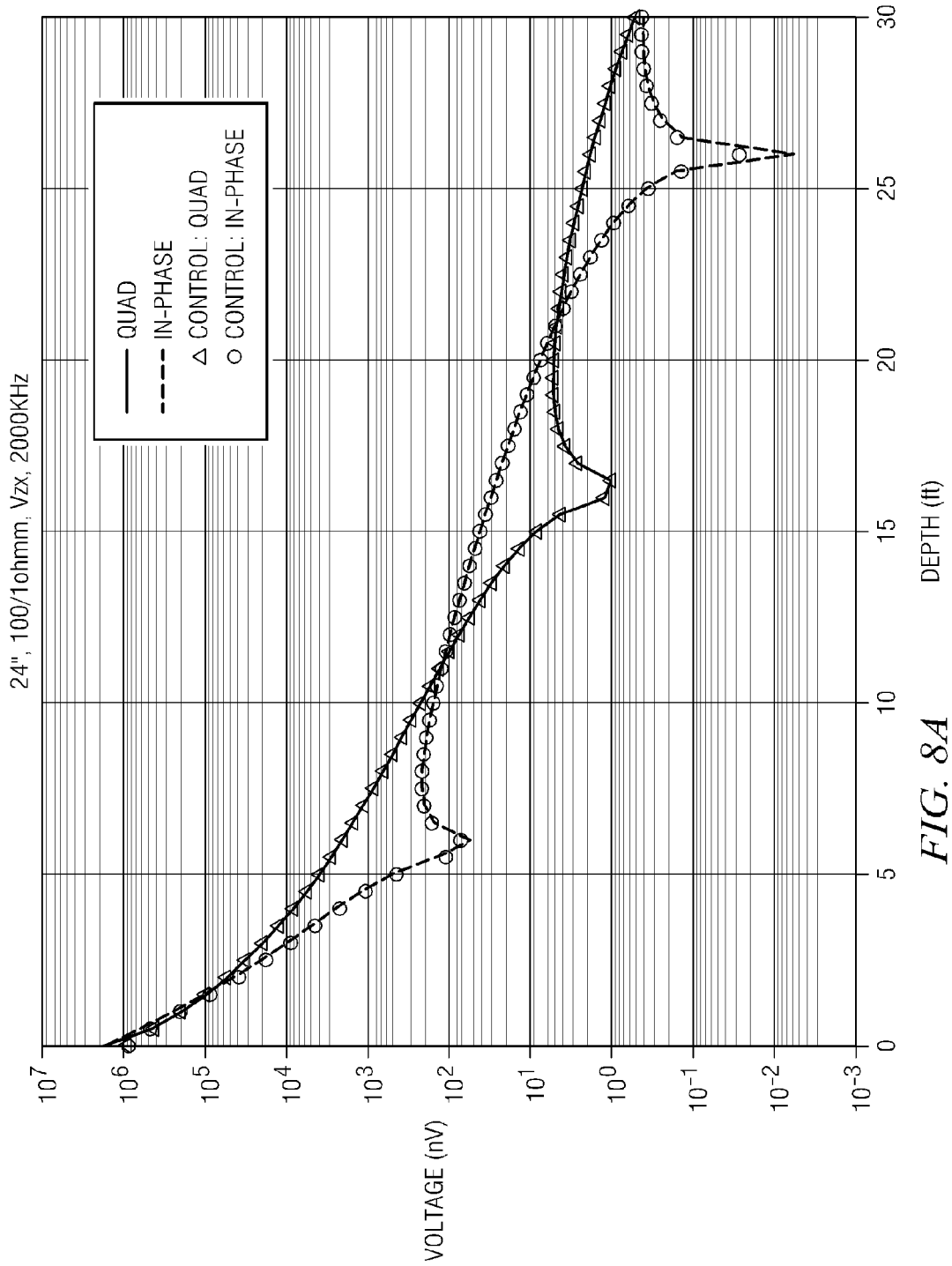
FIGS. 8A, 8B, 9A, 9B, 10A, 10B, and 11 depict voltage versus distance plots that compare exemplary embodiments of the present invention with prior art (control) inversion methodologies.
Figure 8B:
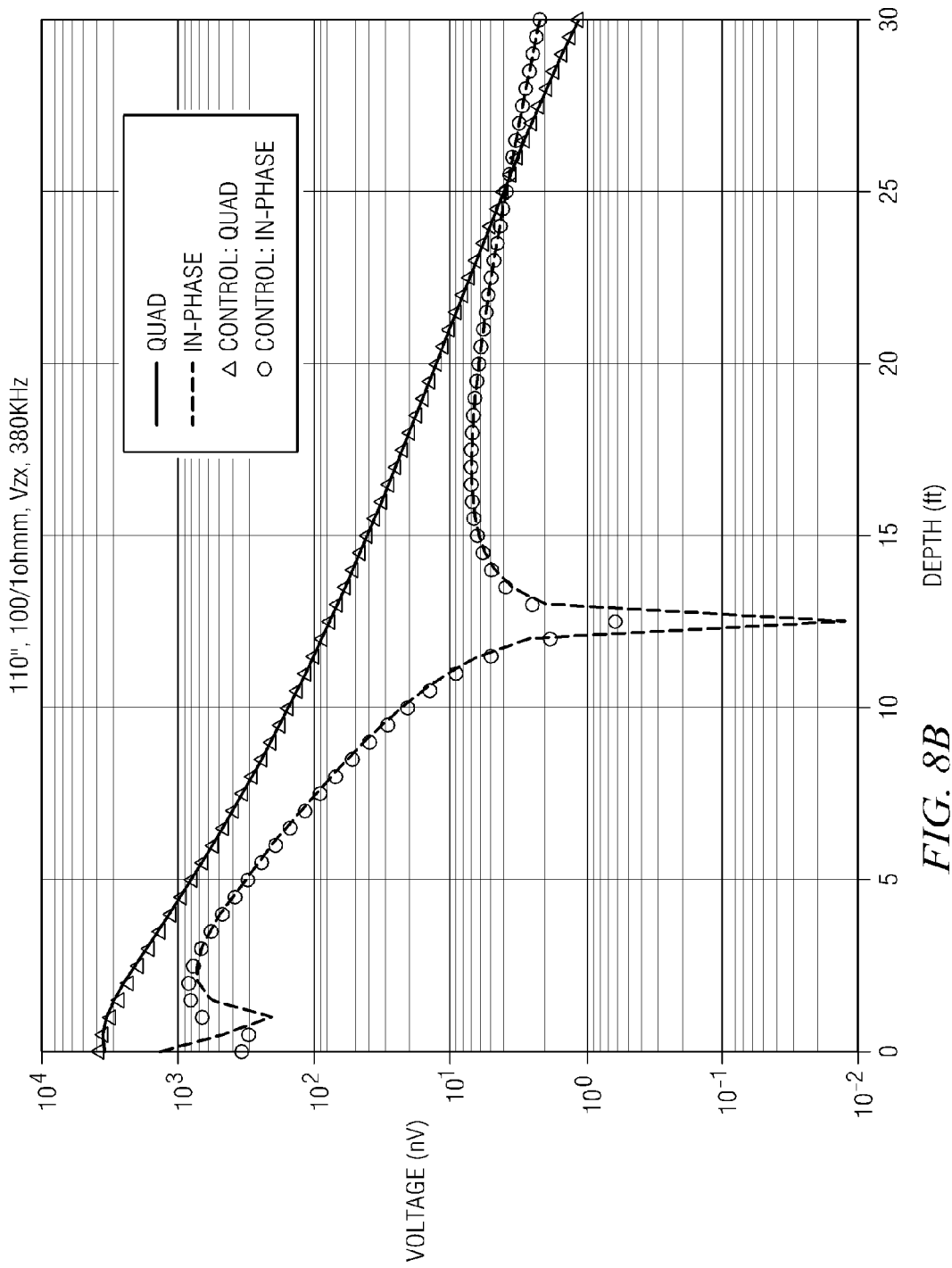

In FIGS. 8A and 8B a two-layer model is used in which the directional resistivity tool is parallel to the bed boundary (e.g., as depicted on FIG. 4). In these examples the near bed resistivity is 100 ohm·m and the far bed resistivity is 1 ohm·m. In the example depicted on FIG. 8A, the transmitted electromagnetic wave has an operating frequency of 2 MHz. The axial spacing between the transmitter and the receiver is 24 inches. In the example depicted on FIG. 8B, the transmitted electromagnetic wave has an operating frequency of 380 KHz. The axial spacing between the transmitter and the receiver is 110 inches. As depicted the results obtained from the inventive methodology and the control are virtually indistinguishable from one another.

Figure 9A:
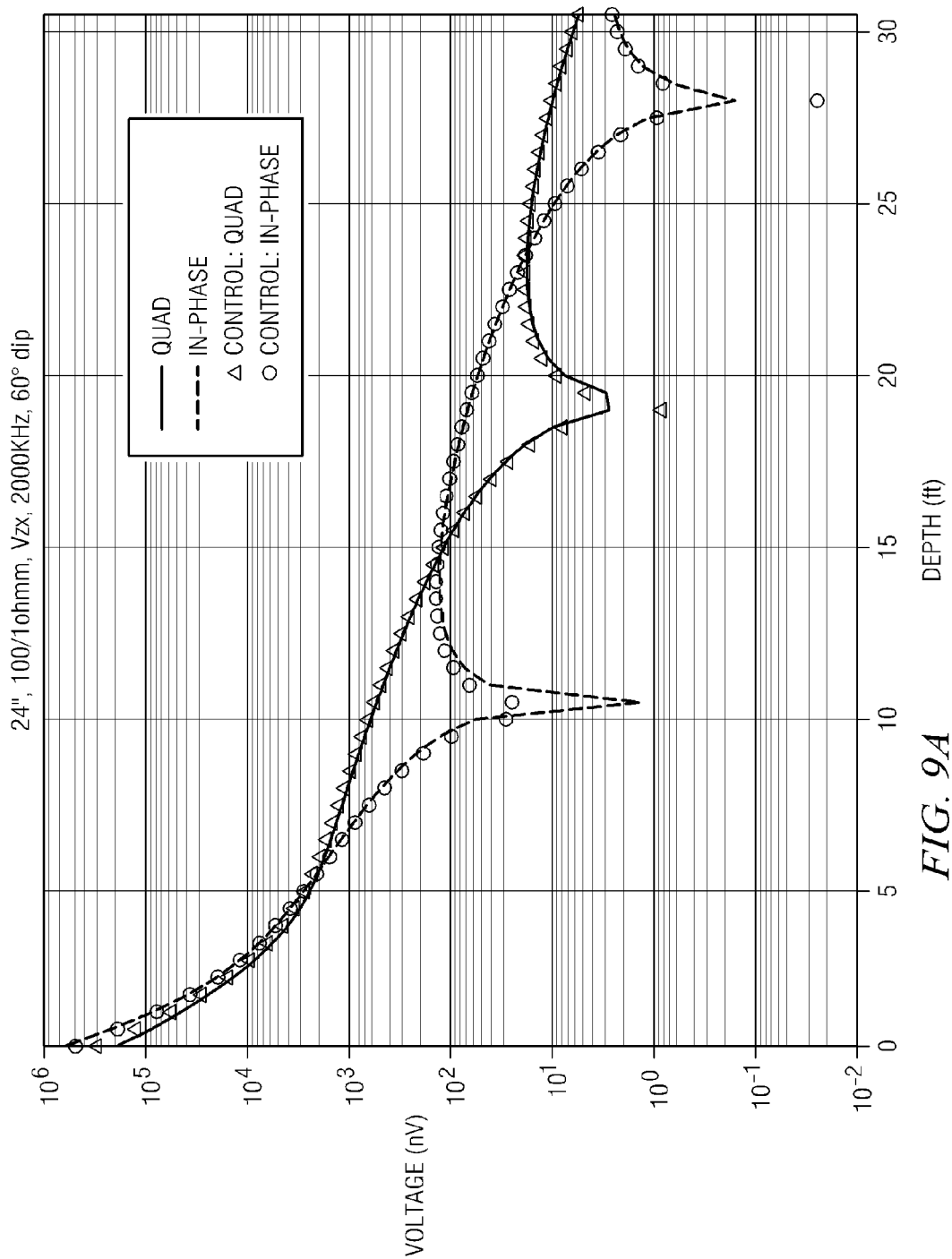
Figure 9B:
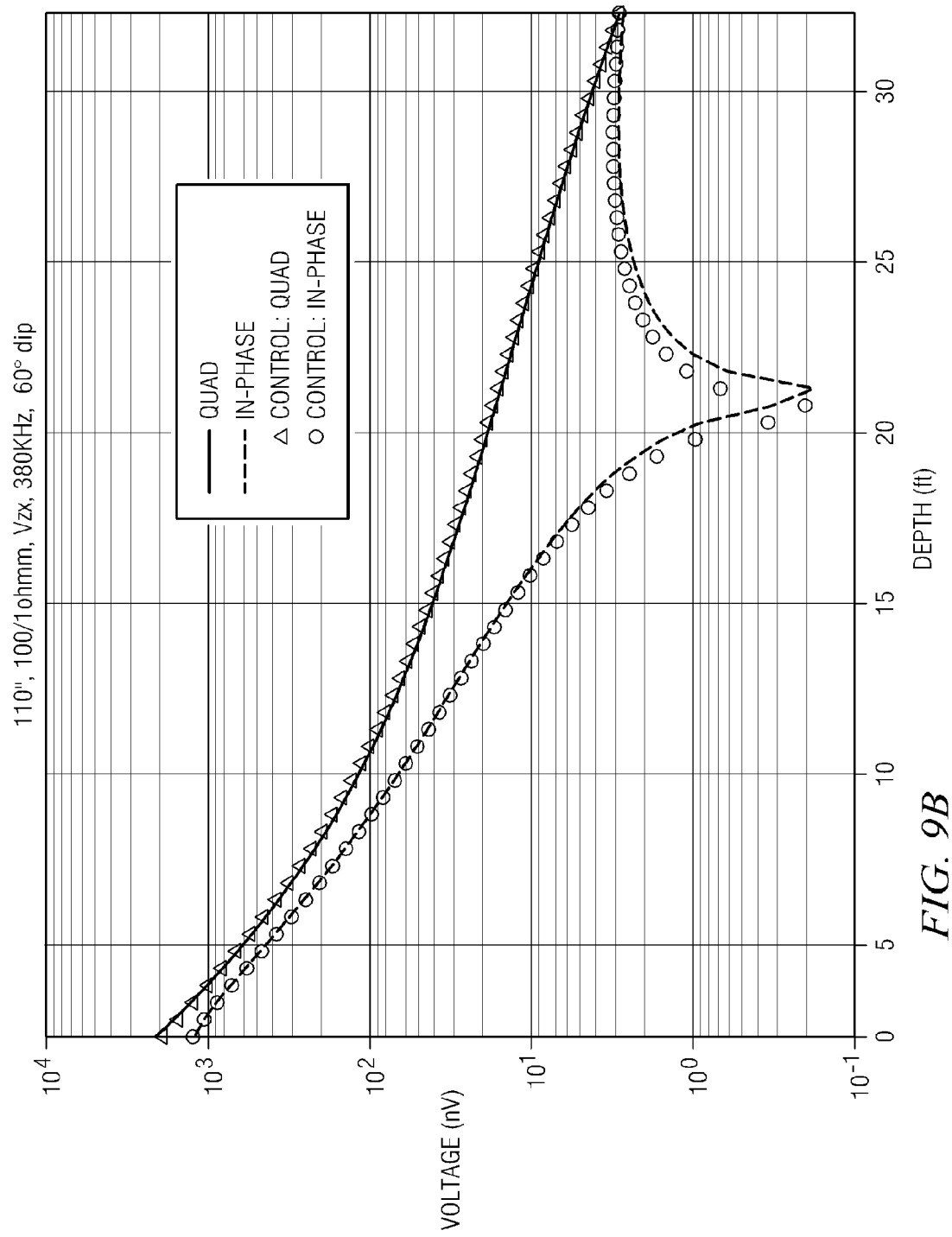

In FIGS. 9A and 9B a two-layer model is utilized in which the directional resistivity tool has a dip angle of 60 degrees with respect to the bed boundary (e.g., as depicted on FIG. 5). The near bed and far bed resistivities are again 100 ohm·m and 1 ohm·m. In the example depicted on FIG. 9A, the transmitted electromagnetic wave has an operating frequency of 2 MHz and the axial spacing between the transmitter and the receiver is 24 inches. In the example depicted on FIG. 9B, the transmitted electromagnetic wave has an operating frequency of 380 KHz and the axial spacing between the transmitter and the receiver is 110 inches. As depicted there is excellent agreement between the results obtained from the inventive methodology and the control.

Figure 10A:
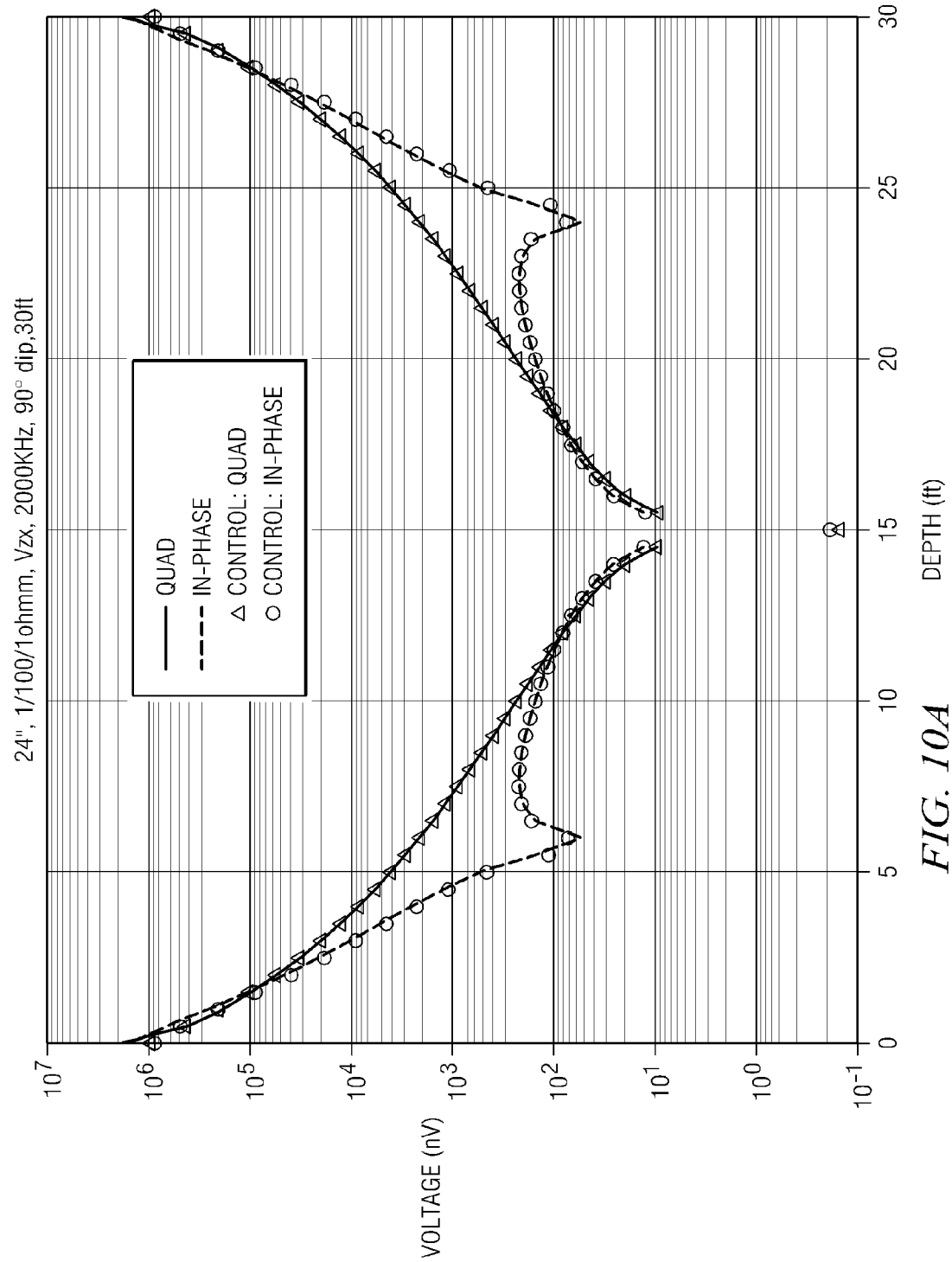
Figure 10B:
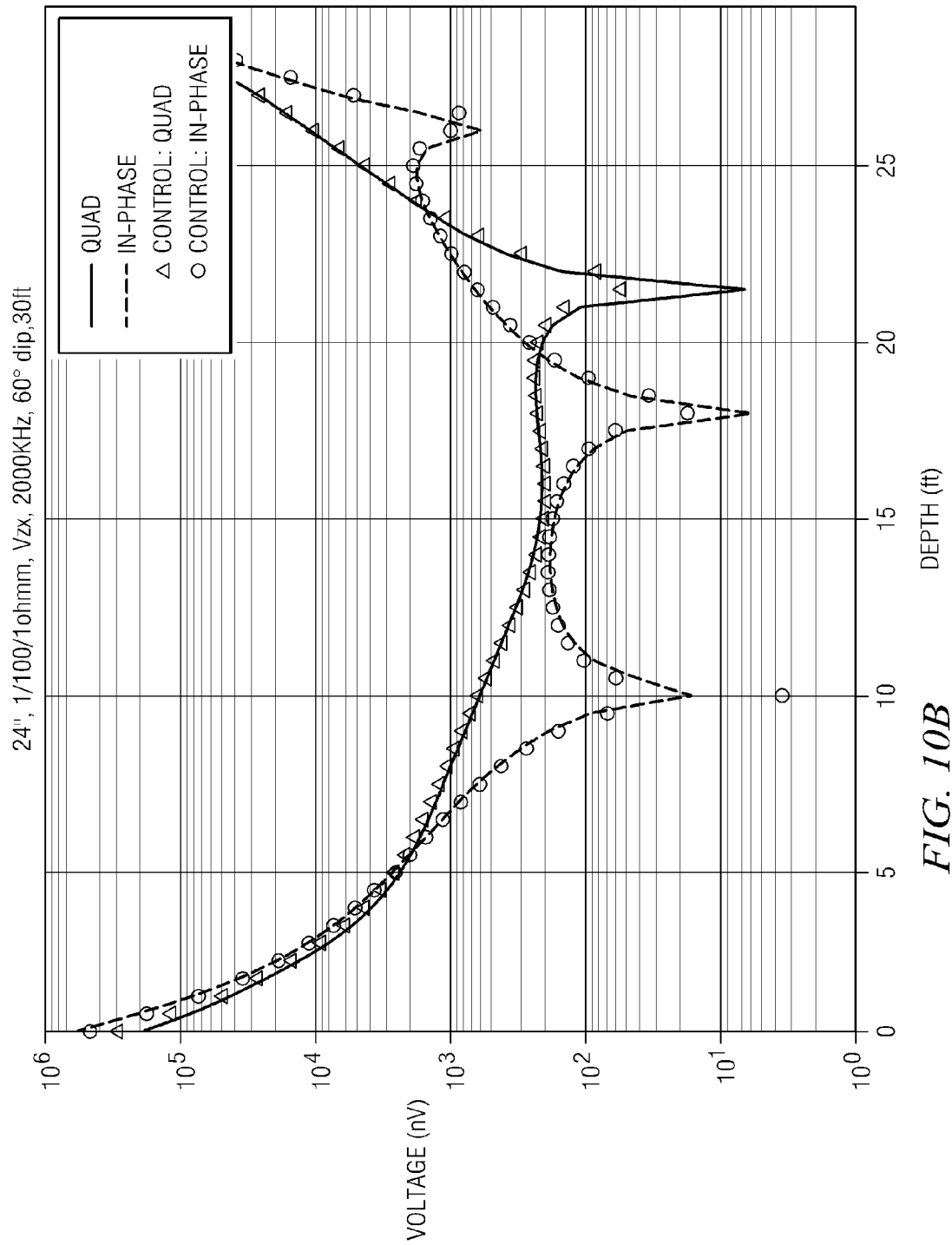

In FIG. 10A a three-layer model is used in which the directional resistivity tool is parallel to both the upper and lower bed boundaries (e.g., as depicted on FIG. 6). In FIG. 10B the upper and lower boundaries are parallel with one another and the directional resistivity tool has a dip angle of 60 degrees with respect to the boundaries. In both examples the near bed thickness is 30 feet. The upper and lower remote beds have resistivities of 1 ohm·m and the near bed has a resistivity of 100 ohm·m. The transmitted electromagnetic waves have an operating frequency of 2 MHz and the axial spacing between the transmitter and the receiver is 24 inches. In the example depicted in FIG. 10A the results obtained from the inventive methodology and the control are virtually indistinguishable from one another. In the example depicted in FIG. 10B there is excellent agreement between the results obtained from the inventive methodology and the control.

Figure 11:
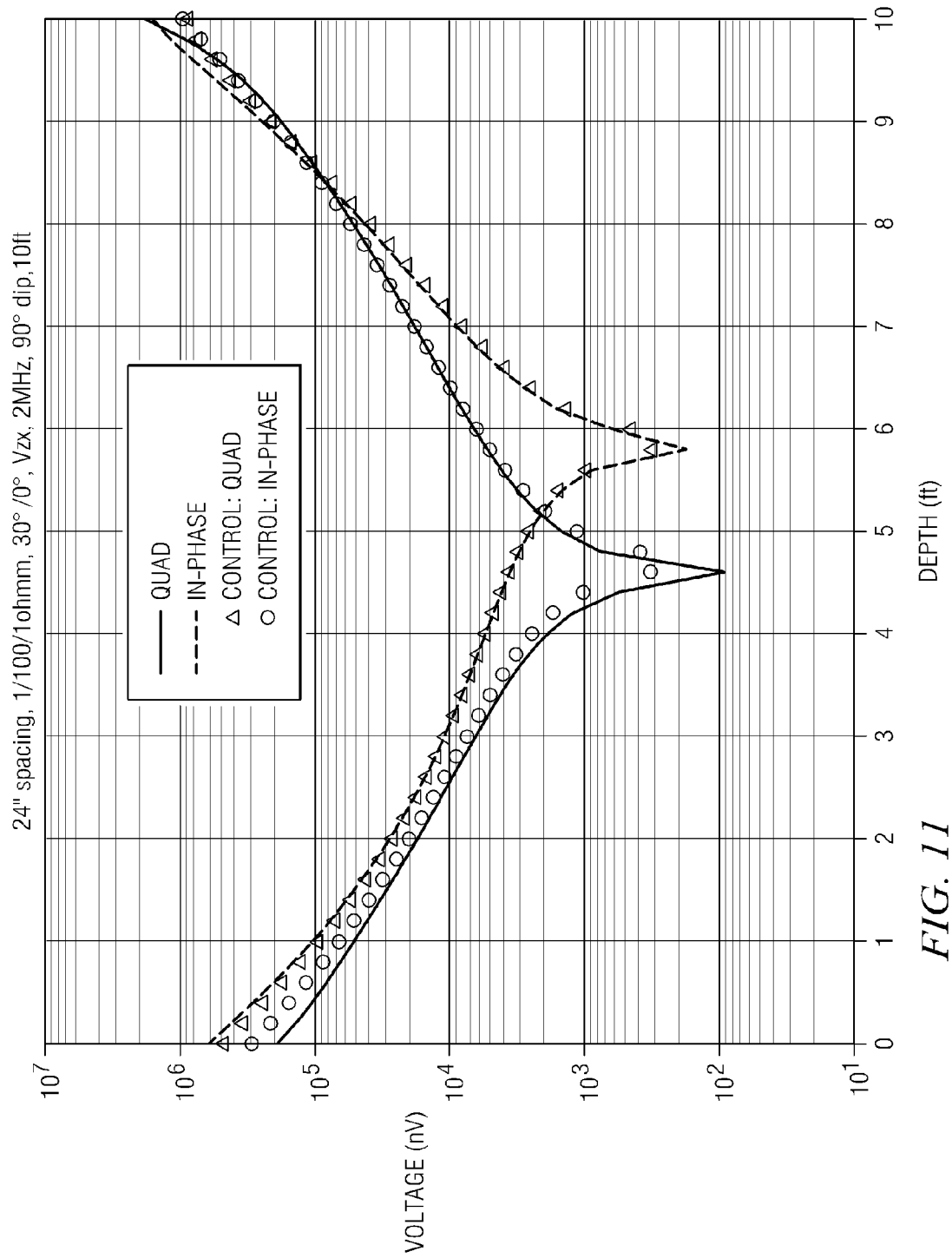

In FIG. 11 a three-layer model is used in which the upper and lower boundaries are non-parallel (e.g., as depicted on FIG. 7). Such a configuration can not generally be forward modeled using a conventional one-dimensional model. As such, a three-dimensional model is used as the control. Such three-dimensional models require extensive computational resources and are generally not considered to be suitable for use in drilling operations. In this particular example $\beta_1=30$, $\beta_2=0$, and $\theta=90$ degrees. The near bed thickness is 10 feet. The upper and lower remote beds have resistivities of 1 ohm·m and the near bed has a resistivity of 100 ohm·m. The transmitted electromagnetic waves have an operating frequency of 2 MHz and the axial spacing between the transmitter and the receiver is 24 inches. As depicted, there is again excellent agreement between the results obtained from the inventive methodology and the control.

In the examples depicted on FIGS. 8 through 10, the inventive methodology utilized approximately one-fiftieth or less of the computational resources as compared to the prior art control methodology (the full-tensor Dipvolt code described above). In the example depicted on FIG. 11, the inventive methodology utilized less than one one-thousandth of the computational resources as compared to the prior art three-dimensional forward model. The reduced processing requirements achieved via use of the present invention represent a highly significant advantage and may advantageously enable the inventive methodology to be implemented on board a conventional downhole processor or other programmable circuitry having limited processing capability. Such downhole processing may further enable the practical implementation of a real-time, closed-loop payzone steering methodology.

It will be understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MWD/LWD sub. Alternatively the processing system may be at the surface and configured to process data sent to the surface by sensor sets via a telemetry or data link system also well known in the art. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

We claim:

1. A method for estimating a value of at least a first formation parameter from a directional resistivity measurement, the method comprising:

(a) acquiring a forward model of a subterranean formation, the forward model including at least one analytical expression relating a directional resistivity measurement to at least the first formation parameter, wherein the analytical expression includes at least one image source term;

(b) causing a processor to compute a plurality of hypothetical directional resistivity measurements for a corresponding plurality of values of the first formation parameter;

(c) acquiring at least one directional resistivity measurement;

(d) selecting a value of at least the first formation parameter for which the hypothetical directional resistivity measurement computed in (b) substantially matches the directional resistivity measurement acquired in (c).

2. The method of claim 1, wherein (b) comprises causing a downhole processor to compute a plurality of hypothetical directional resistivity measurements for a corresponding plurality of values of the first formation parameter.

3. The method of claim 1, wherein the forward model acquired in (a) comprises a two-layer formation model in which a directional resistivity tool is deployed in a first formation layer spaced apart from a boundary between the first formation layer and a second formation layer.

4. The method of claim 3, wherein the directional resistivity tool is substantially parallel with the boundary between the first and second formation layers.

5. The method of claim 4, wherein the at least one analytical expression comprises an expression relating at least one cross-coupling component to at least the first formation parameter, the expression being selected from at least one of the following:

$$H_{ZX} = \underbrace{\frac{M_Z}{4\pi} \frac{e^{-jk_n r}}{r^5}(k_n^2 r^2 - 3jk_n r - 3)(2d + 2h)a}_{\text{from image source}}$$

$$H_{XZ} = -\underbrace{\frac{M_X}{4\pi} \frac{e^{-jk_n r}}{r^5}(k_n^2 r^2 - 3jk_n r - 3)(2d + 2h)a}_{\text{from image source}}$$

wherein $H_{ZX}$ and $H_{XZ}$ represent the cross-coupling components, $M_Z$ and $M_X$ represent the dipole moments of z-mode and x-mode transmitters, a represents an axial distance between a transmitter and a receiver, r represents a distance between an image source and the receiver, d represents a complex valued distance between the boundary and a theoretical image plane, h represents a distance between directional resistivity tool and the boundary, and $k_n$ is the wave number of the first formation layer.

6. The method of claim 4, wherein the at least one analytical expression comprises an expression relating at least one coupling component to at least the first formation parameter, the expression being selected from at least one of the following:

$$H_{ZZ} = \underbrace{\frac{M_Z}{4\pi}\left\{\frac{e^{-jk_n r}}{r^5}(k_n^2 r^2 - 3jk_n r - 3)(2d + 2h)^2 + \frac{2e^{-jk_n r}}{r^3}(jk_n r + 1)\right\}}_{\text{from image source}} +$$

-continued $$H_{XX} = \underbrace{\frac{M_X}{4\pi}\left\{\frac{e^{-jk_n r}}{r^5}(k_n^2 r^2 - 3jk_n r - 3)(2d+2h)^2 - \frac{e^{-jk_n r}}{r^3}(k_n^2 r^2 - jk_n r - 1)\right\}}_{\text{from image source}} + \underbrace{\frac{M_Z}{4\pi}\frac{2e^{-jk_n a}}{a^3}(jk_n a + 1)}_{\text{from real source}}$$

$$+ \underbrace{\frac{M_X}{4\pi}\frac{e^{-jk_n a}}{a^3}(k_n^2 a^2 - jk_n a - 1)}_{\text{from real source}}$$

wherein $H_{ZZ}$ and $H_{XX}$ the coupling components, $M_Z$ and $M_X$ represent the dipole moments of z-mode and x-mode transmitters, a represents an axial distance between a transmitter and a receiver, r represents a distance between an image source and the receiver, d represents a complex valued distance between the boundary and a theoretical image plane, h represents a distance between directional resistivity tool and the boundary, and $k_n$ is the wave number of the first formation layer.

7. The method of claim 4, wherein the at least one analytical expression comprises an expression relating at least one coupling component to at least the first formation parameter, the expression being selected from at least one of the following:

$$H_{ZZ} = \underbrace{\frac{M_Z}{4\pi}\left\{\frac{e^{-jk_n r}}{r^5}(k_n^2 r^2 - 3jk_n r - 3)(2d+2h)^2 - \frac{e^{-jk_n r}}{r^3}(k_n^2 r^2 + jk_n r + 1)\cos^2\theta + \frac{2e^{-jk_n r}}{r^3}(jk_n r + 1)\right\}}_{\text{from image source}} + \underbrace{\frac{M_Z}{4\pi}\frac{2e^{-jk_n a}}{a^3}(jk_n a + 1)}_{\text{from real source}}$$

$$H_{XX} = \underbrace{\frac{M_X}{4\pi}\left\{\frac{e^{-jk_n r}}{r^5}(k_n^2 r^2 - 3jk_n r - 3)(2d+2h)^2 - \frac{e^{-jk_n r}}{r^3}(k_n^2 r^2 + jk_n r + 1)\sin^2\theta + \frac{2e^{-jk_n r}}{r^3}(jk_n r + 1)\right\}}_{\text{from image source}} + \underbrace{\frac{M_X}{4\pi}\frac{e^{-jk_n a}}{a^3}(k_n^2 a^2 - jk_n a - 1)}_{\text{from real source}}$$

wherein $H_{ZZ}$ and $H_{XX}$ the coupling components, $M_Z$ and $M_X$ represent the dipole moments of z-mode and x-mode transmitters, a represents an axial distance between a transmitter and a receiver, r represents a distance between an image source and the receiver, d represents a complex valued distance between the boundary and a theoretical image plane, h represents a distance between directional resistivity tool and the boundary, $k_n$ is the wave number of the first formation layer, and $\theta$ represents a dip angle between the directional resistivity tool and the boundary.

8. The method of claim 4, wherein the at least one analytical expression comprises an expression relating at least one coupling component to at least the first formation parameter, the expression being selected from at least one of the following:

$$H_{ZZ} = \underbrace{\frac{M_Z}{4\pi}\left\{\frac{e^{-jk_n r_1}}{r_1^5}(k_n^2 r_1^2 - 3jk_n r_1 - 3)(2d_1+2h_1)^2 + \frac{2e^{-jk_n r_1}}{r_1^3}(jk_n r_1 + 1)\right\}}_{\text{from image source 1}}$$

$$+ \underbrace{\frac{M_Z}{4\pi}\left\{\frac{e^{-jk_n r_2}}{r_2^5}(k_n^2 r_2^2 - 3jk_n r_2 - 3)(2d_2+2h_2)^2 + \frac{2e^{-jk_n r_2}}{r_2^3}(jk_n r_2 + 1)\right\}}_{\text{from image source 2}} + \underbrace{\frac{M_Z}{4\pi}\frac{2e^{-jk_n a}}{a^3}(jk_n a + 1)}_{\text{from real source}}$$

$$H_{XX} = \underbrace{\frac{M_X}{4\pi}\left\{\frac{e^{-jk_n r_1}}{r_1^5}(k_n^2 r_1^2 - 3jk_n r_1 - 3)(2d_1+2h_1)^2 - \frac{e^{-jk_n r_1}}{r_1^3}(k_n^2 r_1^2 - jk_n r_1 - 1)\right\}}_{\text{from image source 1}} +$$

-continued $$\frac{M_X}{4\pi}\left\{\frac{e^{-jk_n r_2}}{r_2^5}(k_n^2 r_2^2 - 3jk_n r_2 - 3)(2d_2 + 2h_2)^2 - \frac{e^{-jk_n r_2}}{r_2^3}(k_2^2 r_2^2 - jk_n r_2 - 1)\right\}+$$
<center>from image source 2</center>

$$\frac{M_X}{4\pi}\frac{e^{-jk_n a}}{a^3}(k_n^2 a^2 - jk_n a - 1)$$
<center>from real source</center> wherein $H_{ZZ}$ and $H_{XX}$ the coupling components, $M_Z$ and $M_X$ represent the dipole moments of z-mode and x-mode transmitters, a represents an axial distance between a transmitter and a receiver, $r_1$ and $r_2$ represent distances between first and second image sources and the receiver, $d_1$ and $d_2$ represent first and second complex valued distances between the first boundary and a first theoretical image plane and the second boundary and a second theoretical image plane, $h_1$ and $h_2$ represent distances between the directional resistivity tool and the first and second boundaries, and $k_n$ is the wave number of the first formation layer.

9. The method of claim 3, wherein the at least one analytical expression comprises an expression relating at least one cross-coupling component to at least the first formation parameter, the expression being selected from at least one of the following:

$$H_{ZX} = \frac{M_Z}{4\pi}\left\{\frac{e^{-jk_n r}}{r^5}(k_n^2 r^2 - 3jk_n r - 3)(2d + 2h)a\sin\theta + \frac{e^{-jk_n r}}{r^3}(k_n^2 r^2 + jk_n r + 1)\sin\theta\cos\theta\right\}$$
<center>from image source</center>

$$H_{XZ} = \frac{M_X}{4\pi}\left\{-\frac{e^{-jk_n r}}{r^5}(k_n^2 r^2 - 3jk_n r - 3)(2d + 2h)a\sin\theta + \frac{e^{-jk_n r}}{r^3}(k_n^2 r^2 + jk_n r + 1)\sin\theta\cos\theta\right\}$$
<center>from image source</center> wherein $H_{ZX}$ and $H_{XZ}$ represent the cross-coupling components, $M_Z$ and $M_X$ represent the dipole moments of z-mode and x-mode transmitters, a represents an axial distance between a transmitter and a receiver, r represents a distance between an image source and the receiver, d represents a complex valued distance between the boundary and a theoretical image plane, h represents a distance between directional resistivity tool and the boundary, $k_n$ is the wave number of the first formation layer, and θ represents a dip angle between the directional resistivity tool and the boundary.

10. The method of claim 1, wherein the forward model acquired in (a) comprises a three-layer model in which a directional resistivity tool is deployed in a first formation layer between first and second boundaries, the first boundary between the first formation layer and a second formation layer and the second boundary between the first formation layer and a third formation layer.

11. The method of claim 10, wherein the first boundary and the second boundary are substantially parallel with one another.

12. The method of claim 11, wherein the directional resistivity tool is substantially parallel with the first and second boundaries.

13. The method of claim 12, wherein the at least one analytical expression comprises an expression relating at least one cross-coupling component to at least the first formation parameter, the expression being selected from at least one of the following:

$$H_{ZX} = \frac{M_Z}{4\pi}\left\{\frac{e^{-jk_n r_1}}{r_1^5}(k_n^2 r_1^2 - 3jk_n r_1 - 3)(2d_1 + 2h_1)a + \right.$$
<center>from image source 1</center>

$$\frac{M_Z}{4\pi}\left\{-\frac{e^{-jk_n r_2}}{r_2^5}(k_n^2 r_2^2 - 3jk_n r_2 - 3)(2d_2 + 2h_2)a\right.$$
<center>from image source 2</center>

$$H_{XZ} = \frac{M_X}{4\pi}\left\{-\frac{e^{-jk_n r_1}}{r_1^5}(k_n^2 r_1^2 - 3jk_n r_1 - 3)(2d_1 + 2h_1)a + \right.$$
<center>from image source 1</center>

-continued $$\frac{M_X}{4\pi}\left\{\frac{e^{-jk_n r_2}}{r_2^5}(k_n^2 r_2^2 - 3jk_n r_2 - 3)(2d_2 + 2h_2)a\right.$$
<center>from image source 2</center> wherein $H_{ZX}$ and $H_{XZ}$ represent the cross-coupling components, $M_Z$ and $M_X$ represent the dipole moments of z-mode and x-mode transmitters, a represents an axial distance between a transmitter and a receiver, $r_1$ and $r_2$ represent distances between first and second image sources and the receiver, $d_1$ and $d_2$ represent first and second complex valued distances between the first boundary and a first theoretical image plane and the second boundary and a second theoretical image plane, $h_1$ and $h_2$ represent distances between the directional resistivity tool and the first and second boundaries, and $k_n$ is the wave number of the first formation layer.

14. The method of claim 9, wherein the at least one analytical expression comprises an expression relating at least one cross-coupling component to at least the first formation parameter, the expression being selected from at least one of the following:

$$H_{ZX} = \frac{M}{4\pi}\underbrace{\{A_1(2d_1+2h_1)a\sin(\theta-\beta_1)+\beta_1\sin(\theta-\beta_1)\cos(\theta-\beta_1)+}_{\text{from image source 1}}$$

$$\underbrace{\frac{M}{4\pi}\{-A_2(2d_2+2h_2)a\sin(\theta+\beta_2)+B_2\sin(\theta+\beta_2)\cos(\theta+\beta_2)}_{\text{from image source 2}}$$

$$H_{XZ} = \frac{M_X}{4\pi}\underbrace{\{-A_1(2d_1+2h_1)a\sin(\theta-\beta_1)+B_1\sin(\theta-\beta_1)\cos(\theta-\beta_1)+}_{\text{from image source 1}}$$

$$\underbrace{\frac{M_X}{4\pi}\{A_2(2d_2+2h_2)a\sin(\theta+\beta_2)+\beta_2\sin(\theta+\beta_2)\cos(\theta+\beta_2)}_{\text{from image source 2}}$$

wherein $$A_1 = \frac{e^{-jk_n r_1}}{r_1^5}(k_n^2 r_1^2 - 3jk_n r_1 - 3),$$

$$A_2 = \frac{e^{-jk_n r_2}}{r_2^5}(k_n^2 r_2^2 - 3jk_n r_2 - 3)$$

$$B_1 = \frac{e^{-jk_n r_1}}{r_1^3}(k_n^2 r_1^2 + jk_n r_1 + 1),$$

$$B_2 = \frac{e^{-jk_n r_2}}{r_2^3}(k_n^2 r_2^2 + jk_n r_2 + 1)$$

and wherein $H_{ZX}$ and $H_{XZ}$ the cross-coupling components, $M_Z$ and $M_X$ represent the dipole moments of z-mode and x-mode transmitters, a represents an axial distance between a transmitter and a receiver, $r_1$ and $r_2$ represent distances between first and second image sources and the receiver, $d_1$ and $d_2$ represent first and second complex valued distances between the first boundary and a first theoretical image plane and the second boundary and a second theoretical image plane, $h_1$ and $h_2$ represent distances between the directional resistivity tool and the first and second boundaries, $k_n$ is the wave number of the first formation layer, $\theta$ represents a dip angle of the directional resistivity with respect to a horizontal plane, $\beta_1$ represents a dip angle of the first boundary with respect to the horizontal plane, and $\beta_2$ represents a dip angle of the second boundary with respect to the horizontal plane.

15. The method of claim 9, wherein the at least one analytical expression comprises an expression relating at least one coupling component to at least the first formation parameter, the expression being selected from at least one of the following:

$$H_{ZZ} = \frac{M_Z}{4\pi}\underbrace{\left\{A_1(2d_1+2h_1)^2 - B_1\cos^2(\theta-\beta_1) + \frac{2e^{-jk_n r_1}}{r_1^3}(jk_n r_1 + 1)\right\}}_{\text{from image source 1}} +$$

$$\underbrace{\frac{M_Z}{4\pi}\left\{A_2(2d_2+2h_2)^2 - B_2\cos^2(\theta+\beta_2) + \frac{2e^{-jk_n r_2}}{r_2^3}(jk_n r_2 + 1)\right\}}_{\text{from image source 2}}$$

$$+ \underbrace{\frac{M_Z}{4\pi}\frac{2e^{-jk_n a}}{a^3}(jk_n a + 1)}_{\text{from real source}}$$

-continued $$H_{XX} = \frac{M_X}{4\pi}\underbrace{\left\{A_1(2d_1+2h_1)^2 - B_1\sin^2(\theta-\beta_1) + \frac{2e^{-jk_n r_1}}{r_1^3}(jk_n r_1 + 1)\right\}}_{\text{from image source 1}} +$$

$$\underbrace{\frac{M_X}{4\pi}\left\{A_2(2d_2+2h_2)^2 - B_2\sin^2(\theta+\beta_2) + \frac{2e^{-jk_n r_2}}{r_2^3}(jk_n r_2 + 1)\right\}}_{\text{from image source 2}}$$

$$+ \underbrace{\frac{M_X}{4\pi}\frac{e^{-jk_n a}}{a^3}(k_n^2 a^2 - jk_n a - 1)}_{\text{from real source}}$$

wherein $$A_1 = \frac{e^{-jk_n r_1}}{r_1^5}(k_n^2 r_1^2 - 3jk_n r_1 - 3),$$

$$A_2 = \frac{e^{-jk_n r_2}}{r_2^5}(k_n^2 r_2^2 - 3jk_n r_2 - 3)$$

$$B_1 = \frac{e^{-jk_n r_1}}{r_1^3}(k_n^2 r_1^2 + jk_n r_1 + 1),$$

$$B_2 = \frac{e^{-jk_n r_2}}{r_2^3}(k_n^2 r_2^2 + jk_n r_2 + 1)$$

and wherein $H_{ZZ}$ and $H_{XX}$ the coupling components, $M_Z$ and $M_X$ represent the dipole moments of z-mode and x-mode transmitters, a represents an axial distance between a transmitter and a receiver, $r_1$ and $r_2$ represent distances between first and second image sources and the receiver, $d_1$ and $d_2$ represent first and second complex valued distances between the first boundary and a first theoretical image plane and the second boundary and a second theoretical image plane, $h_1$ and $h_2$ represent distances between the directional resistivity tool and the first and second boundaries, $k_n$ is the wave number of the first formation layer, $\theta$ represents a dip angle of the directional resistivity with respect to a horizontal plane, $\beta_1$ represents a dip angle of the first boundary with respect to the horizontal plane, and $\beta_2$ represents a dip angle of the second boundary with respect to the horizontal plane.

16. A method for estimating a value of at least a first formation parameter from a directional resistivity measurement, the method comprising:
(a) acquiring a forward model of a subterranean formation, the forward model including at least one analytical expression relating a directional resistivity measurement to at least the first formation parameter, the analytical expression including at least one image source term;
(b) causing a downhole processor to compute a plurality of hypothetical directional resistivity measurements for a corresponding plurality of values of the first formation parameters;
(c) acquiring at least one directional resistivity measurement;
(d) selecting a value of at least the first formation parameter for which the hypothetical directional resistivity measurement computed in (b) substantially matches the directional resistivity measurement acquired in (c).

17. The method of claim 16, wherein the forward model acquired in (a) comprises a two-layer formation model in which a directional resistivity tool is deployed in a first formation layer spaced apart from a boundary between the first formation layer and a second formation layer.

18. The method of claim 16, wherein the directional resistivity tool is substantially parallel with the boundary between the first and second formation layers.

19. The method of claim 16, wherein the forward model acquired in (a) comprises a three-layer model in which a directional resistivity tool is deployed in a first formation layer between first and second boundaries, the first boundary between the first formation layer and a second formation layer and the second boundary between the first formation layer and a third formation layer.

20. The method of claim 19, wherein the first boundary, the second boundary, and the directional resistivity tool are substantially parallel with one another.

\* \* \* \* \*